(12) United States Patent
Takeda et al.

(10) Patent No.: US 12,082,189 B2
(45) Date of Patent: *Sep. 3, 2024

(54) SIMULTANEOUS PUCCH-PUSCH WITH DIFFERENT PRIORITIES

(71) Applicant: QUALCOMM Incorporated, San Diego, CA (US)

(72) Inventors: Kazuki Takeda, Minato-ku (JP); Peter Gaal, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,705

(22) Filed: Jul. 3, 2023

(65) Prior Publication Data

US 2023/0422243 A1 Dec. 28, 2023

Related U.S. Application Data

(63) Continuation of application No. 17/165,743, filed on Feb. 2, 2021, now Pat. No. 11,743,890.

(Continued)

(51) Int. Cl.
*H04W 72/1268* (2023.01)
*H04L 1/1607* (2023.01)

(Continued)

(52) U.S. Cl.
CPC ....... *H04W 72/1268* (2013.01); *H04L 1/1664* (2013.01); *H04W 72/0453* (2013.01);

(Continued)

(58) Field of Classification Search
CPC ......... H04W 72/1268; H04W 72/0453; H04W 72/21; H04W 72/23; H04W 72/56;

(Continued)

(56) References Cited

U.S. PATENT DOCUMENTS 9,913,258 B2  3/2018 Kim et al.
2013/0114461 A1* 5/2013 Seo ........................ H04L 1/0073
370/252

(Continued)

FOREIGN PATENT DOCUMENTS

CN  104868986 A  8/2015
CN  109792739 A  5/2019
CN  110622598 A  12/2019

OTHER PUBLICATIONS

Huawei, et al., "Discussion on Partially Overlapped PUCCH and PUSCH", 3GPP TSG-RAN WG1 #92, 3GPP Draft, R1-1801788, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), 5 Pages, XP051397762.

(Continued)

*Primary Examiner* — Candal Elpenord
(74) *Attorney, Agent, or Firm* — Holland & Hart LLP

(57) ABSTRACT

Methods, systems, and devices for wireless communications are described. The described techniques may provide for handling of priority indications in scenarios where simultaneous physical uplink control channel (PUCCH)-physical uplink shared channel (PUSCH) is supported. For example, wireless communications systems may configure (e.g., via radio resource control (RRC) signaling) simultaneous PUCCH-PUSCH across two or more carriers, where piggybacking of feedback information on uplink shared channel transmission may be disabled. Further, a grant (e.g., downlink control information (DCI) scheduling a PUSCH transmission) may include a priority index field to indicate a priority associated with a transmission or resources scheduled by the grant. The described techniques may provide for efficient handling of priority indications associated with scheduled transmissions that overlap when simultaneous (Continued)

PUCCH-PUSCH is supported (e.g., techniques are provided for performing or dropping scheduled transmissions that overlap when simultaneous PUCCH-PUSCH is enabled based on any priority indications associated with the overlapping scheduled transmissions).

24 Claims, 17 Drawing Sheets

Related U.S. Application Data

(60) Provisional application No. 62/970,084, filed on Feb. 4, 2020.

(51) Int. Cl.
*H04W 72/0453* (2023.01)
*H04W 72/21* (2023.01)
*H04W 72/23* (2023.01)
*H04W 72/56* (2023.01)

(52) U.S. Cl.
CPC .......... *H04W 72/21* (2023.01); *H04W 72/23* (2023.01); *H04W 72/56* (2023.01)

(58) Field of Classification Search
CPC .. H04W 72/569; H04L 1/1664; H04L 1/0026; H04L 1/1887; H04L 1/1854; H04L 1/1671; H04L 5/001; H04L 5/0055; H04L 5/0094; H04L 5/0044; H04L 5/0053; H04L 5/0064
USPC .................................................. 370/329–330
See application file for complete search history.

(56) References Cited

U.S. PATENT DOCUMENTS

| | | |
|---|---|---|
| 2017/0215179 A1 | 7/2017 | Choi et al. |
| 2018/0324768 A1 | 11/2018 | Shaheen et al. |
| 2019/0306923 A1 | 10/2019 | Xiong et al. |
| 2020/0015250 A1 | 1/2020 | Yang et al. |
| 2020/0228248 A1* | 7/2020 | Islam .................... H04L 1/1861 |
| 2020/0296701 A1* | 9/2020 | Park ...................... H04L 1/1896 |
| 2020/0328849 A1 | 10/2020 | Noh et al. |
| 2021/0037555 A1 | 2/2021 | Papasakellariou |
| 2021/0105126 A1 | 4/2021 | Yi et al. |
| 2021/0243779 A1 | 8/2021 | Takeda et al. |
| 2022/0078768 A1 | 3/2022 | El Hamss et al. |
| 2022/0116964 A1 | 4/2022 | Islam et al. |
| 2022/0287057 A1 | 9/2022 | Yamamoto et al. |

OTHER PUBLICATIONS

Huawei, et al., "Discussion on UCI Feedback for URLLC", 3GPP TSG RAN WG1 Ad Hoc Meeting, 3GPP Draft, R1-1800054, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018, XP051384557, 13 pages, Sections 2.2 and 2.3 and Proposal 2.

International Search Report and Written Opinion—PCT/US2021/016369—ISA/EPO—May 19, 2021.

International Preliminary Report on Patentability—PCT/US2021/016369, The International Bureau of WIPO—Geneva, Switzerland, Aug. 18, 2022.

* cited by examiner

SIMULTANEOUS PUCCH-PUSCH WITH DIFFERENT PRIORITIES

CROSS REFERENCE

The present Application for Patent is a continuation of U.S. patent application Ser. No. 17/165,743 by TAKEDA et al., entitled "SIMULTANEOUS PUCCH-PUSCH WITH DIFFERENT PRIORITIES," filed Feb. 2, 2021, which claims the benefit of U.S. Provisional Patent Application No. 62/970,084 by TAKEDA et al., entitled "SIMULTANEOUS PUCCH-PUSCH WITH DIFFERENT PRIORITIES," filed Feb. 4, 2020, assigned to the assignee hereof, and expressly incorporated by reference herein.

BACKGROUND

The following relates generally to wireless communications, and more specifically to simultaneous physical uplink control channel (PUCCH)-physical uplink shared channel (PUSCH) with different priorities.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support simultaneous physical uplink control channel (PUCCH)-physical uplink shared channel (PUSCH) with different priorities. Generally, the described techniques provide for simultaneous PUCCH and PUSCH transmission. For example, wireless communications systems may support and enable simultaneous PUCCH-PUSCH across two or more carriers. In some cases, to efficiently support simultaneous PUCCH-PUSCH, a carrier configured for a PUSCH transmission may further be configured to disable control information (e.g., a carrier configured for PUSCH in a simultaneous PUCCH-PUSCH scenario may be configured as a data only carrier). For example, wireless communications systems may configure (e.g., via radio resource control (RRC) signaling) simultaneous PUCCH-PUSCH across two or more carriers, where piggybacking of feedback information on an uplink shared channel transmission may be disabled.

In other words, wireless communications systems may configure simultaneous PUCCH-PUSCH such that feedback information (e.g., hybrid automatic repeat request (HARQ) feedback, periodic channel state information (P-CSI), etc.) of PUCCH may not be piggybacked (e.g., multiplexed) on the PUSCH. Further, the described techniques may provide for efficient handling of priority indications in scenarios where simultaneous PUCCH-PUSCH is supported (e.g., techniques are provided for performing or dropping scheduled transmissions that overlap when simultaneous PUCCH-PUSCH is enabled based on any priority indications associated with the overlapping scheduled transmissions).

A method of wireless communication at a UE is described. The method may include receiving a feedback information piggybacking status for a first uplink carrier of a set of uplink carriers configured for the UE, receiving a first uplink grant that indicates a first uplink channel transmission occasion and a first priority index for a first uplink transmission on the first uplink carrier, and receiving a second uplink grant that indicates a second uplink channel transmission occasion that at least partially overlaps in time with the first uplink channel transmission occasion. The method may further include performing, based on the feedback information piggybacking status for the first uplink carrier and the first priority index, the first uplink transmission on the first uplink carrier during the first uplink channel transmission occasion, a second uplink transmission during the second uplink channel transmission occasion, or both.

An apparatus for wireless communication at a UE is described. The apparatus may include a processor, memory coupled with the processor, and instructions stored in the memory. The instructions may be executable by the processor to cause the apparatus to receive a feedback information piggybacking status for a first uplink carrier of a set of uplink carriers configured for the UE, receive a first uplink grant that indicates a first uplink channel transmission occasion and a first priority index for a first uplink transmission on the first uplink carrier, and receive a second uplink grant that indicates a second uplink channel transmission occasion that at least partially overlaps in time with the first uplink channel transmission occasion. The instructions may be executable by the processor to further cause the apparatus to perform, based on the feedback information piggybacking status for the first uplink carrier and the first priority index, the first uplink transmission on the first uplink carrier during the first uplink channel transmission occasion, a second uplink transmission during the second uplink channel transmission occasion, or both.

Another apparatus for wireless communication at a UE is described. The apparatus may include means for receiving a feedback information piggybacking status for a first uplink carrier of a set of uplink carriers configured for the UE, receiving a first uplink grant that indicates a first uplink channel transmission occasion and a first priority index for a first uplink transmission on the first uplink carrier, receiving a second uplink grant that indicates a second uplink channel transmission occasion that at least partially overlaps in time with the first uplink channel transmission occasion, and performing, based on the feedback information piggybacking status for the first uplink carrier and the first priority index, the first uplink transmission on the first uplink carrier during the first uplink channel transmission occasion, a second uplink transmission during the second uplink channel transmission occasion, or both.

A non-transitory computer-readable medium storing code for wireless communication at a UE is described. The code may include instructions executable by a processor to receive a feedback information piggybacking status for a first uplink carrier of a set of uplink carriers configured for the UE, receive a first uplink grant that indicates a first uplink channel transmission occasion and a first priority index for a first uplink transmission on the first uplink carrier, receive a second uplink grant that indicates a second uplink channel transmission occasion that at least partially overlaps in time with the first uplink channel transmission occasion, and perform, based on the feedback information piggybacking status for the first uplink carrier and the first priority index, the first uplink transmission on the first uplink carrier during the first uplink channel transmission occasion, a second uplink transmission during the second uplink channel transmission occasion, or both.

Some examples of the method, apparatuses, and non-transitory computer-readable medium described herein may further include operations, features, means, or instructions for identifying a priority of the first uplink transmission and the second uplink transmission based on the first priority index and the second uplink channel transmission occasion at least partially overlapping in time with the first uplink channel transmission occasion, where the first uplink transmission, the second uplink transmission, or both may be performed based on the priority.

In some examples of the method, apparatuses, and non-transitory computer-readable medium described herein, receiving the second uplink grant may include operations, features, means, or instructions for receiving the second uplink grant that indicates the second uplink channel transmission occasion and a second priority index for the second uplink transmission, where the first uplink transmission, the second uplink transmission, or both may be performed based on the first priority index, the second priority index, and the feedback information piggybacking status.

Some examples of the method, apparatuses, and non-transitory computer-readable medium described herein may further include operations, features, means, or instructions for identifying an uplink control channel occasion at least partially overlaps in time with the first uplink channel transmission occasion based on the first uplink grant, and performing or dropping an uplink control transmission during the uplink control channel occasion based on the first priority index, the second priority index, the feedback information piggybacking status, or some combination thereof.

Some examples of the method, apparatuses, and non-transitory computer-readable medium described herein may further include operations, features, means, or instructions for dropping the second uplink transmission based on the second priority index being associated with a lower priority than the first priority index, where the first uplink transmission and the uplink control transmission may be performed based on the dropping of the second uplink transmission.

Some examples of the method, apparatuses, and non-transitory computer-readable medium described herein may further include operations, features, means, or instructions for dropping the first uplink transmission, the uplink control transmission, or both based on the first priority index being associated with a lower priority than the second priority index, where the second uplink transmission may be performed based on the dropping of the first uplink transmission, the uplink control transmission, or both.

Some examples of the method, apparatuses, and non-transitory computer-readable medium described herein may further include operations, features, means, or instructions for identifying a second uplink control channel occasion at least partially overlaps in time with the second uplink channel transmission occasion based on the second uplink grant, and dropping the second uplink transmission, a second uplink control transmission during the second uplink control channel occasion, or both based on the second priority index being associated with a lower priority than the first priority index, where the first uplink transmission and the uplink control transmission may be performed based on the dropping of the second uplink transmission, the second uplink control transmission, or both.

Some examples of the method, apparatuses, and non-transitory computer-readable medium described herein may further include operations, features, means, or instructions for determining the second uplink transmission may be associated with a second uplink carrier based on the second grant, where the second uplink carrier may be different from the first uplink carrier. In some examples of the method, apparatuses, and non-transitory computer-readable medium described herein, the first uplink transmission and the second uplink transmission may be performed based on the feedback information piggybacking status for the first uplink carrier and the second uplink carrier being different from the first uplink carrier.

Some examples of the method, apparatuses, and non-transitory computer-readable medium described herein may further include operations, features, means, or instructions for determining the second uplink transmission may be associated with the first uplink carrier based on the second grant, and dropping the second uplink transmission based on the second priority index being associated with a lower priority than the first priority index and the second uplink transmission being associated with the first carrier, where the first uplink transmission may be performed based on the dropping of the second uplink transmission.

Some examples of the method, apparatuses, and non-transitory computer-readable medium described herein may further include operations, features, means, or instructions for determining the first uplink transmission may be associated with a first frequency band, and determining the uplink control transmission may be associated with a second frequency band, where the first uplink transmission and the uplink control transmission may be performed based on the first frequency band being different than the second frequency band.

Some examples of the method, apparatuses, and non-transitory computer-readable medium described herein may further include operations, features, means, or instructions for determining the uplink control transmission may be associated with a first frequency band, and determining the second uplink transmission may be associated with a second frequency band, where the uplink control transmission and the second uplink transmission may be performed based on the first frequency band being different than the second frequency band.

Some examples of the method, apparatuses, and non-transitory computer-readable medium described herein may further include operations, features, means, or instructions for determining the first uplink transmission may be associated with a first frequency band, determining the second uplink transmission may be associated with the first frequency band, and dropping the first uplink transmission or the second uplink transmission based on the first uplink transmission and the second uplink transmission being associated with the first frequency band, where the first uplink transmission or the second uplink transmission may be performed based on the dropping of the first uplink transmission or the second uplink transmission. In some examples of the method, apparatuses, and non-transitory computer-readable medium described herein, the first uplink transmission or the second uplink transmission may be dropped based on the first priority index, the second priority index, and the feedback information piggybacking status.

Some examples of the method, apparatuses, and non-transitory computer-readable medium described herein may further include operations, features, means, or instructions for identifying a first uplink control channel occasion at least partially overlaps in time with the first uplink channel transmission occasion based on the first uplink grant, identifying a second uplink control channel occasion at least partially overlaps in time with the second uplink channel transmission occasion based on the second uplink grant, and performing the first uplink transmission during the first uplink channel transmission occasion, the second uplink transmission during the second uplink channel transmission occasion, a first uplink control transmission during the first uplink control channel occasion, a second uplink control transmission during the second uplink control channel occasion, or some combination thereof based on the feedback information piggybacking status.

In some examples of the method, apparatuses, and non-transitory computer-readable medium described herein, the first uplink transmission and the first uplink control transmission may be configured on a first cell group and the second uplink transmission and the second uplink control transmission may be configured on a second cell group.

A method for wireless communication at a base station is described. The method may include transmitting a feedback information piggybacking status for a first uplink carrier of a set of multiple uplink carriers configured for a UE, transmitting a first uplink grant that indicates a first uplink channel transmission occasion and a first priority index for a first uplink transmission on the first uplink carrier, transmitting a second uplink grant that indicates a second uplink channel transmission occasion that at least partially overlaps in time with the first uplink channel transmission occasion, and receiving, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

An apparatus for wireless communication at a base station is described. The apparatus may include a processor, memory coupled with the processor, and instructions stored in the memory. The instructions may be executable by the processor to cause the apparatus to transmit a feedback information piggybacking status for a first uplink carrier of a set of multiple uplink carriers configured for a UE, transmit a first uplink grant that indicates a first uplink channel transmission occasion and a first priority index for a first uplink transmission on the first uplink carrier, transmit a second uplink grant that indicates a second uplink channel transmission occasion that at least partially overlaps in time with the first uplink channel transmission occasion, and receive, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

Another apparatus for wireless communication at a base station is described. The apparatus may include means for transmitting a feedback information piggybacking status for a first uplink carrier of a set of multiple uplink carriers configured for a UE, means for transmitting a first uplink grant that indicates a first uplink channel transmission occasion and a first priority index for a first uplink transmission on the first uplink carrier, means for transmitting a second uplink grant that indicates a second uplink channel transmission occasion that at least partially overlaps in time with the first uplink channel transmission occasion, and means for receiving, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

A non-transitory computer-readable medium storing code for wireless communication at a base station is described. The code may include instructions executable by a processor to transmit a feedback information piggybacking status for a first uplink carrier of a set of multiple uplink carriers configured for a UE, transmit a first uplink grant that indicates a first uplink channel transmission occasion and a first priority index for a first uplink transmission on the first uplink carrier, transmit a second uplink grant that indicates a second uplink channel transmission occasion that at least partially overlaps in time with the first uplink channel transmission occasion, and receive, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

DETAILED DESCRIPTION

Figure 1:
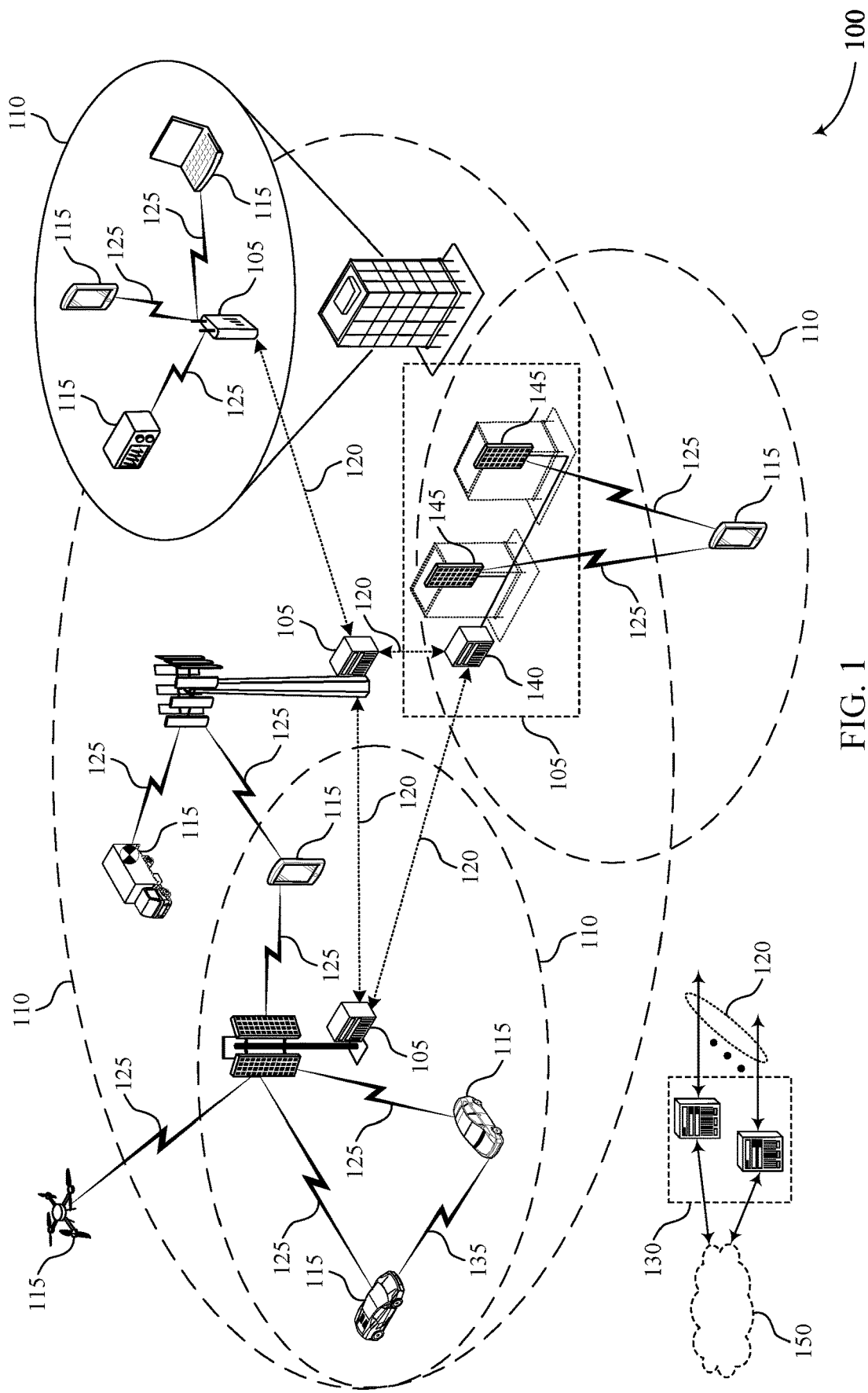
FIG. 1 illustrates an example of a system for wireless communications that supports simultaneous physical uplink control channel (PUCCH)-physical uplink shared channel (PUSCH) with different priorities in accordance with aspects of the present disclosure.

A user equipment (UE) may transmit feedback information to a base station based on successful or unsuccessful reception and decoding of a downlink transmission from the base station. A base station may initially schedule resources for a downlink transmission in a physical downlink shared channel (PDSCH) from the base station by transmitting, to the UE, a downlink grant indicating the resources. The UE may then monitor the resources, and may transmit feedback information based on a successful or unsuccessful reception of the downlink transmission. The UE may transmit the feedback information in a physical uplink control channel (PUCCH) transmission to the base station. For example, the UE may receive an uplink grant scheduling hybrid automatic repeat request (HARQ) feedback in a PUCCH.

In some cases, the UE may also receive an uplink grant scheduling other transmissions (e.g., data transmissions) in a physical uplink shared channel (PUSCH). In some cases, the PUCCH may be scheduled for a time overlapped with a PUSCH in time. The overlap may be symbol-level (i.e., the PUCCH and a PUSCH are concurrently scheduled in one or more symbols in time) or slot-level (i.e., the PUCCH and a PUSCH are scheduled in a same slot). In such cases, the UE may use the PUSCH to transmit feedback information, rather than transmitting the feedback information in the overlapped PUCCH. For example, the UE may "piggyback" uplink control information (UCI) (e.g., HARQ feedback, periodic channel state information (P-CSI)) on the PUSCH. In other examples, a UE may receive an uplink grant scheduling a PUSCH transmission that overlaps in time with scheduled PUCCH. In such cases, the UE may similarly piggyback (e.g., multiplex) UCI associated with the PUCCH transmission onto the PUSCH (e.g., and the UE may drop the PUCCH as to avoid simultaneous PUCCH-PUSCH transmission).

According to the techniques described herein, wireless communications systems may support simultaneous PUCCH-PUSCH transmission. For example, wireless communications systems may support and enable simultaneous PUCCH-PUSCH across two or more carriers. In some cases, to efficiently support simultaneous PUCCH-PUSCH, a carrier configured for a PUSCH transmission may further be configured to disable communication of control information via the carrier (e.g., a carrier configured for PUSCH in a simultaneous PUCCH-PUSCH scenario may be configured as a data only carrier or a "non-piggyback" carrier). For example, wireless communications systems may configure (e.g., via radio resource control (RRC) signaling) simultaneous PUCCH-PUSCH across two or more carriers, where piggybacking of feedback information on an uplink shared channel transmission may be disabled. In other words, wireless communications systems may configure simultaneous PUCCH-PUSCH such that feedback information (e.g., HARQ feedback, P-CSI) of PUCCH may not be piggybacked (e.g., multiplexed) on the PUSCH.

For instance, for some uplink carrier aggregation (CA) scenarios (e.g., for inter-frequency range (inter-FR) CA, inter-band CA, CA across carriers with different subcarrier spacing (SCS), CA in License Assisted Access (LAA) systems, etc.) disabling UCI piggybacking on PUSCH for some uplink carriers may provide for more efficient communications. Configuring simultaneous PUCCH-PUSCH and disabling UCI piggybacking on PUSCH for some uplink carriers may allow utilization of some secondary cells (SCells) for data only, which may provide for more efficient handling of control information (e.g., improved HARQ procedures), improved data throughput (e.g., on PUSCH), decoupling operations of two uplink carriers, etc.

Further, the described techniques may provide for handling of priority indications in scenarios where simultaneous PUCCH-PUSCH is supported. For example, a grant (e.g., downlink control information (DCI) scheduling a PUSCH transmission) may include a priority index field to indicate a priority associated with a transmission or resources scheduled by the grant. The described techniques may provide for efficient handling of priority indications associated with scheduled transmissions that overlap when simultaneous PUCCH-PUSCH is supported (e.g., techniques are provided for performing or dropping scheduled transmissions that overlap when simultaneous PUCCH-PUSCH is enabled based on any priority indications associated with the overlapping scheduled transmissions).

Aspects of the disclosure are initially described in the context of a wireless communications system. Example simultaneous PUCCH-PUSCH transmission diagrams and an example process flow illustrating aspects of the discussed techniques are then described. Aspects of the disclosure are further illustrated by and described with reference to apparatus diagrams, system diagrams, and flowcharts that relate to simultaneous PUCCH-PUSCH with different priorities.

FIG. 1 illustrates an example of a wireless communications system 100 that supports simultaneous PUCCH-PUSCH with different priorities in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ LAA, LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may receive an uplink grant from a base station 105 that indicates scheduling information for uplink transmissions by the UE 115. For example, an uplink grant may indicate scheduling information including time and frequency resources for an uplink transmission (e.g., a PUSCH transmission). Similarly, a UE 115 may receive a downlink grant from a base station 105 that indicates scheduling information for downlink transmissions from the base station 105 to the UE 115. For example, a downlink grant may indicate scheduling information including time and frequency resources for a downlink transmission (e.g., a PDSCH transmission). In some cases, the PDSCH may include downlink data and may further schedule an uplink feedback transmission (e.g., a PUCCH transmission) from the UE 115 to the base station 105 (e.g., where the PUCCH may include HARQ feedback associated with the PDSCH transmission).

In some cases, a base station 105 may transmit an uplink grant to a UE 115 that indicates scheduling information for an uplink transmission (e.g., a PUSCH transmission) by the UE 115. In some scenarios, the base station 105 may also transmit a downlink grant scheduling feedback information (e.g., UCI) to be piggybacked on the uplink shared channel transmission. For example, in some cases an uplink grant may schedule a PUSCH transmission that overlaps in time with a PUCCH transmission, such that the UE 115 may piggyback UCI associated with the PUCCH transmission on the PUSCH transmission. The UE 115 may thus perform the PUSCH transmission (e.g., with PUCCH feedback information multiplexed on the PUSCH) to the base station, and may drop the PUCCH transmission.

As discussed herein, wireless communications system 100 may support simultaneous PUCCH-PUSCH transmission by UEs 115. For example, wireless communications system 100 may support and enable simultaneous PUCCH-PUSCH across two or more carriers. In some cases, to efficiently support simultaneous PUCCH-PUSCH, a carrier configured for a PUSCH transmission may further be configured to disable control information (e.g., a carrier configured for PUSCH in a simultaneous PUCCH-PUSCH scenario may be configured as a data-only carrier or non-piggyback carrier). For example, wireless communications system 100 may configure (e.g., via RRC signaling) simultaneous PUCCH-PUSCH across two or more carriers, where piggybacking of feedback information on uplink shared channel transmission may be disabled. In other words, wireless communications system 100 may configure simultaneous PUCCH-PUSCH such that feedback information (e.g., HARQ feedback, P-CSI) of PUCCH may not be piggybacked (e.g., multiplexed) on the PUSCH (e.g., as the PUCCH and PUSCH may be transmitted simultaneously). Configuring UEs 115 with simultaneous PUCCH-PUSCH and disabling UCI piggybacking on PUSCH for some uplink carriers may allow utilization of some SCells for data only, which may provide for more efficient handling of control information (e.g., improved HARQ procedures), improved data throughput (e.g., on PUSCH), etc.

Figure 2:
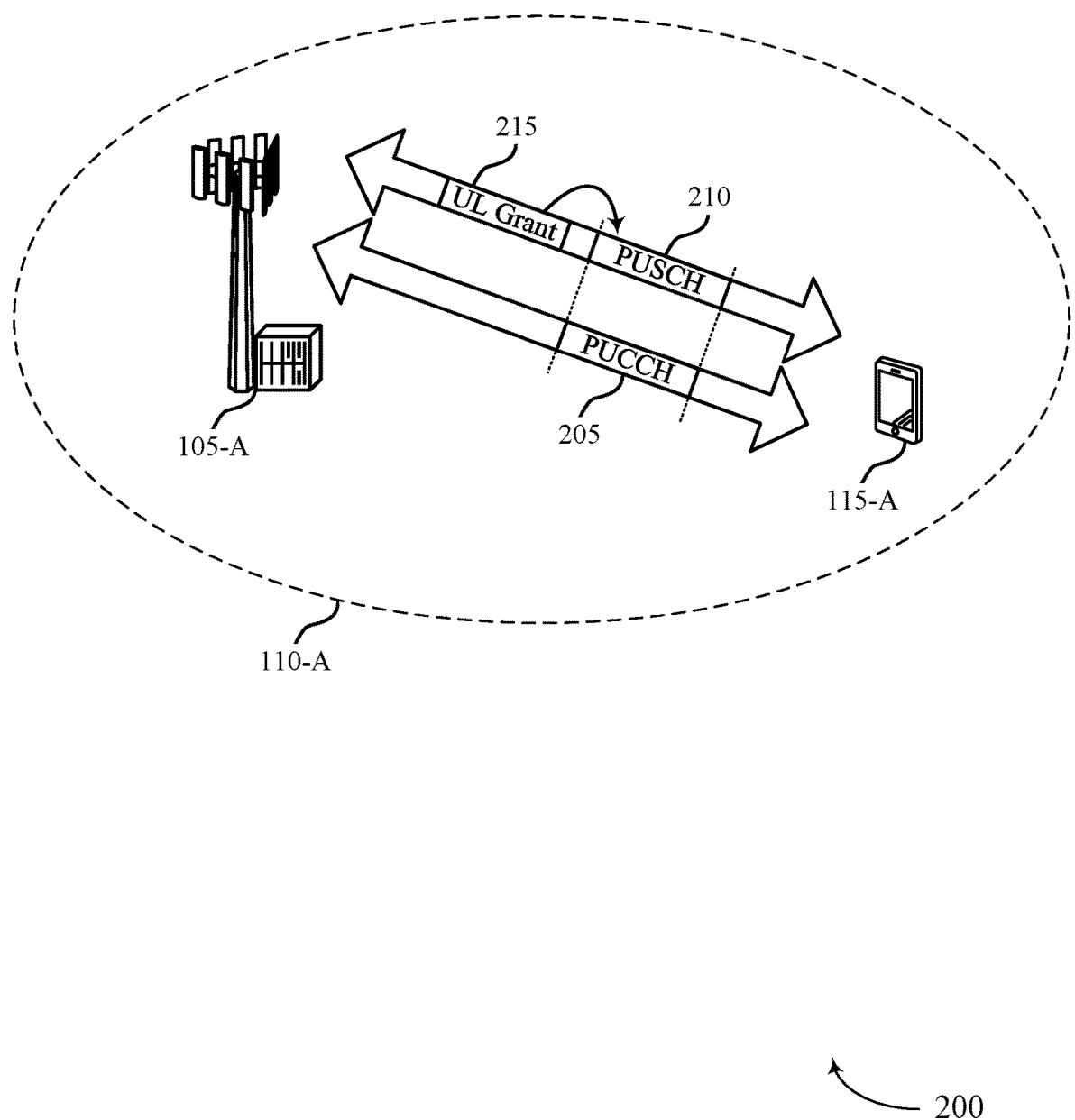
FIG. 2 illustrates an example of a wireless communications system that supports simultaneous PUCCH-PUSCH with different priorities in accordance with aspects of the present disclosure.

FIG. 2 illustrates an example of a wireless communications system 200 that supports simultaneous PUCCH-PUSCH with different priorities in accordance with aspects of the present disclosure. In some examples, wireless communications system 200 may implement aspects of wireless communications system 100. UE 115-*a* may be an example of a UE 115 as described with respect to FIG. 1, and base station 105-*a* may be an example of a base station 105 as described with respect to FIG. 1. Base station 105-*a* may serve a coverage area 110-*a*, which may include UE 115-*a*. In some cases, base station 105-*a* and UE 115-*a* may communicate using various CA schemes. For example, UE 115-*a* may communicate with base station 105-*a* using an uplink CA configuration (e.g., which may include, for example, two uplink carriers, as in the example illustrated by FIG. 2). As discussed herein, wireless communications system 200 may support simultaneous transmission of PUCCH transmission 205 and PUSCH transmission 210 (which may also be referred to as simultaneous PUCCH-PUSCH).

Base station 105-a may transmit an uplink grant 215 to UE 115-a. Uplink grant 215 may schedule a set of uplink resources for UE 115-a to use to transmit an uplink transmission (e.g., a PUSCH transmission 210). In some cases, a UE 115-a may transmit a scheduling request (SR) to base station 105-a, prompting base station 105-a to transmit the uplink grant 215 to UE 115-a. For example, UE 115-a may identify pending (e.g., buffered) data to be transmitted to base station 105-a, and UE 115-a may accordingly transmit an SR to base station 105-a to request uplink resources for transmission of the pending data. In response to the SR, base station 105-a may transmit uplink grant 215 to UE 115-a, and UE 115-a may transmit uplink data (e.g., PUSCH transmission 210) to the base station 105-a using time and frequency resources indicated by the uplink grant 215.

In some cases, base station 105-a may transmit a downlink grant (which may also be referred to as a downlink assignment or a scheduling assignment) to UE 115-a. The downlink grant may include resources indicating a downlink transmission, such as a PDSCH message, from base station 105-a. UE 115-a may monitor the indicated resources for the PDSCH message, and may attempt to decode the message. Based on monitoring the resources and attempting decoding, UE 115-a may generate feedback information for the PDSCH. The feedback information may be transmitted by UE 115-a in an uplink message. For example, UE 115-a may transmit HARQ feedback, such as an acknowledgment (ACK) or a negative acknowledgment (NACK). An ACK may be transmitted based on a successful reception and decoding of a message from base station 105-a, and a NACK may be transmitted based on unsuccessful reception or decoding of the PDSCH transmission. The feedback information may be transmitted in a PUCCH scheduled by an uplink grant (e.g., which may be included in PDSCH, may be included in the original downlink grant, may be a separate uplink grant, etc.) transmitted to UE 115-a by base station 105-a.

In some scenarios, UE 115-a may piggyback feedback information (e.g., an ACK/NACK for a downlink shared channel transmission) in PUSCH transmission 210. For example, in some cases, a PUCCH transmission 205 may be scheduled for a time that overlaps with a PUSCH transmission 210. Therefore, UE 115-a may use the PUSCH transmission 210 to transmit feedback information. For example, UE 115-a may piggyback UCI on the PUSCH transmission 210 (e.g., HARQ feedback, P-CSI, etc. may be multiplexed onto PUSCH and may be transmitted via PUSCH transmission 210) and UE 115-a may refrain from transmitting the PUCCH. In other examples, UE 115-a may receive an uplink grant 215 scheduling a PUSCH transmission 210 that overlaps in time with scheduled PUCCH transmission 205 (e.g., as illustrated in the example of FIG. 2). In such cases, UE 115-a may similarly piggyback (e.g., multiplex) UCI associated with the PUCCH transmission 205 onto the PUSCH transmission 210 (e.g., and UE 115-a may drop the PUCCH transmission 205 as to avoid simultaneous PUCCH-PUSCH transmission).

However, in some scenarios, it may be beneficial for wireless communications systems to support simultaneous PUCCH-PUSCH transmission. According to the techniques described herein, wireless communications system 200 may support simultaneous PUCCH-PUSCH transmission. For example, wireless communications system 200 may support and enable simultaneous PUCCH-PUSCH across two or more carriers. In some cases, to efficiently support simultaneous PUCCH-PUSCH, a carrier configured for a PUSCH transmission 210 may further be configured to disable communication of PUCCH control information via the carrier (e.g., a carrier configured for PUSCH in a simultaneous PUCCH-PUSCH scenario may be configured as a data-only carrier). For example, wireless communications system 200 may configure (e.g., via RRC signaling) simultaneous PUCCH-PUSCH across two or more carriers, where piggybacking of feedback information on PUSCH transmission 210 may be disabled (e.g., and PUCCH transmission 205 may be transmitted simultaneously, or at least partially overlapping in time, with PUSCH transmission 210). In other words, wireless communications system 200 may configure simultaneous PUCCH-PUSCH such that feedback information (e.g., HARQ feedback, P-CSI) of PUCCH may not be piggybacked (e.g., multiplexed) on the PUSCH.

In some examples, wireless communications system 200 may illustrate inter-FR CA, inter-band CA, CA across carriers with different SCS, CA in a LAA system, etc., where disabling UCI piggybacking on PUSCH for some uplink carriers of the CA configuration may provide for more efficient communications. For instance, in some cases, a CA configuration may include two carriers on different bands or frequency ranges, may include two carriers with different SCS, etc. such that multiplexing UCI may be computationally complex, may be time consuming, may decrease network reliability and efficiency, etc. As such, disabling UCI piggy backing on a carrier configured for PUSCH may provide for reduced computational complexity, reduced latency (e.g., as, in some cases, the UCI may be transmitted simultaneously via PUCCH transmission 205), or the like.

As another example, in some cases a CA configuration may include one or more carriers in the unlicensed band (e.g., in examples where wireless communications system 200 illustrates an LAA system). In such scenarios, UE 115-a may perform listen-before-talk (LBT) procedures prior to accessing the medium. As such, reliance on UCI piggybacking for communicating feedback information may be inefficient, as the UE 115-a may or may not ultimately win access to the medium for PUSCH transmission 210 on a carrier in the unlicensed band. The described techniques may be implemented to disable UCI piggybacking on such carriers in the unlicensed band (e.g., which may provide for improved reliability of uplink control information via PUCCH transmissions 205, may provide for improved throughput data only carriers via PUSCH transmissions 210, etc.).

As described herein, simultaneous PUCCH-PUSCH may be configured via RRC signaling. For example, RRC configuration may enable simultaneous PUCCH-PUSCH across carriers and, once configured for a particular PUSCH, multiplexing of UCI from PUCCH may be disabled for the particular PUSCH configured for simultaneous PUCCH-PUSCH. In some cases, RRC signaling for simultaneous PUCCH-PUSCH configuration may include configuration of data-only carriers (e.g., where UCI piggybacking is disabled) on a per carrier basis, on a per group-of-uplink-carriers basis, on a per cell-group/PUCCH-group basis, etc.

For example, in some cases, a 1-bit RRC parameter per uplink carrier may configure (e.g., may inform UE 115-a) which uplink carrier(s) are configured as uplink data-only carriers (e.g., where an uplink data-only carrier may refer to an uplink carrier where UCI piggybacking on PUSCH is disabled such that PUSCH does not multiplex HARQ-ACK/

P-CSI in the PUCCH). Once configured, UCI of the PUCCH will not be multiplexed on a PUSCH transmission 210 on the uplink carrier. For supplemental uplink (SUL), one serving cell may have two uplink carriers (UL+SUL), in which case the 1-bit RRC parameter may be per UL/SUL carrier. As an example, in a CA scenario where five uplink carriers are configured for uplink CA and two carriers out of the five carriers are configured with SUL, RRC signaling may include a seven bit sequence for per-uplink-carrier configuration of whether the carriers are uplink data-only carriers (e.g., as there are seven total carriers that may be configured as data-only carriers). For supplemental uplink (SUL), one serving cell may have two uplink carriers (UL+SUL), in which case the 1-bit RRC parameter may be per uplink serving cell (i.e., 1 bit per set of UL+SUL). As an example, in a CA scenario where five uplink carriers are configured for uplink CA and two carriers out of the five carriers are configured with SUL, RRC signaling may include a five bit sequence for per-uplink-serving-cell configuration of whether the carriers are uplink data-only carriers (e.g., as there are five total serving cells which may be configured as data-only carriers).

In some examples, a 1-bit RRC parameter per group of uplink carriers may configure (e.g., inform UE 115-a) which group of uplink carriers is the group of uplink data-only carriers. Once configured, UCI of the PUCCH may not be multiplexed on any PUSCH transmissions 210 in the group of UL carriers indicated by the 1-bit RRC parameter. The per group of uplink carriers can be per band, per FR, per timing advance (TA) group, per cell-group/PUCCH-group, per UE 115, etc. In some cases, signaling overhead may be reduced for configuration of uplink data-only carriers for simultaneous PUCCH-PUSCH configuration.

In some examples, a 1-bit RRC parameter per cell-group/PUCCH-group may configure (e.g., inform UE 115-a) which SCells are the uplink data-only carrier(s) (e.g., which SCells in the bands other than the band for P(S)Cell/PUCCH-SCell in the cell-group/PUCCH-group). Once configured, UCI of the PUCCH may not be multiplexed on a PUSCH in any SCell(s) that is in different band from the P(S)Cell/PUCCH-SCell. As an example, in a CA scenario where five uplink carriers are configured in a cell group, if the RRC parameter corresponding to the cell group is set (e.g., toggled, indicates data only configuration, etc.), one carrier is the PCell, one carrier is SCell in the same band as the PCell (e.g., and thus is not configured as data-only), and the remaining three carriers are in other bands (e.g., and the remaining three carriers are thus configured as data-only carriers). In other words, simultaneous PUCCH-PUSCH may be supported across bands (e.g., simultaneous PUCCH-PUSCH may not be supported within the same band) and, as such, RRC signaling may configure simultaneous PUCCH-PUSCH across bands or across frequency ranges per cell-group accordingly.

In some examples, a 1-bit RRC parameter per UE may configure (e.g., inform UE 115-a) which SCells are the uplink data only carrier(s) (e.g., which SCells in the bands other than the band for PCell). Once configured, UCI of the PUCCH may not be multiplexed on a PUSCH in any SCell(s) that is in different band from the PCell. As an example, in a CA scenario where five uplink carriers are configured in a cell group, if the RRC parameter corresponding to the cell group is set (e.g., toggled, indicates data only configuration, etc.), one carrier is the PCell, one carrier is SCell in the same band as the PCell (e.g., and thus is not configured as data-only), and the remaining three carriers are in other band (e.g., and the remaining three carriers are thus configured as data-only carriers). In other words, simultaneous PUCCH-PUSCH may be supported across bands (e.g., simultaneous PUCCH-PUSCH may not be supported within the same band) and, as such, RRC signaling may configure simultaneous PUCCH-PUSCH across bands or across frequency ranges per cell-group accordingly.

Wireless communications system 200 may handle priority indications in accordance with one or more aspects of the techniques described herein. For example, uplink grant 215 (e.g., DCI scheduling a PUSCH transmission 210) may include a priority index field to indicate a priority associated with a transmission or resources scheduled by the uplink grant 215. For instance, uplink grant 215 may include a priority index field to indicate a priority associated with a PUSCH transmission 210 scheduled by the uplink grant 215. In some cases, UE 115-a may perform or drop scheduled transmissions that overlap, when simultaneous PUCCH-PUSCH is enabled, based on any priority indications associated with the overlapping scheduled transmissions (e.g., as described in more detail herein, for example, with reference to FIGS. 3 through 6). Similarly, base station 105-a may schedule transmissions, receive transmissions, set priority of transmissions, etc. based on one or more aspects of the priority indication handling techniques described herein.

For example, wireless communications system 200 (which, in some examples, may be an example of an ultra-reliable low-latency communications (URLLC) system) may include a one bit priority indication field in the downlink DCI and uplink DCI. If multiple transmissions associated with different priority indexes overlap, the UE 115-a may drop one or more transmissions having a lower priority index. For example, wireless communications system 200 may handle priority indications in two steps. First, any overlapped PUSCH/PUCCH transmissions with the same priority index across uplink carriers may be resolved (e.g., if a PUCCH and a PUSCH associated with the same priority index overlap in time, the UCI on the PUCCH is piggybacked on the PUSCH and the PUCCH is dropped). Second, any overlapped PUSCH/PUCCH transmissions with different priority indices across uplink carriers may be resolved. For instance, Table 1 may illustrate priority handling in example scenarios where simultaneous PUCCH-PUSCH is not configured.

TABLE 1

| Overlapping Scheduled Transmissions | Priority Handling Behavior |
| --- | --- |
| PUCCH with high priority vs PUSCH/PUCCH with low priority | Drop the PUSCH/PUCCH with low priority |
| PUSCH with high priority vs PUCCH with low priority | Drop the PUCCH with low priority |
| Dynamic grant (DG)-PUSCH with high priority vs configured grant (CG)-PUSCH with low priority | Drop the CG-PUSCH with low priority |
| CG-PUSCH with high priority vs DG-PUSCH with low priority | Drop the DG-PUSCH with low priority |
| CG-PUSCH with high priority vs CG-PUSCH with low priority | Drop the CG-PUSCH with low priority |

In scenarios where simultaneous PUCCH-PUSCH is configured, the techniques described herein may provide for additional priority handling techniques, as configuration of simultaneous PUCCH-PUSCH may, in some cases, affect whether overlapping scheduled transmissions can be transmitted simultaneously or whether overlapping scheduled transmissions are to be dropped. In some examples, wireless communications system 200 may not include priority indication fields in DCI scheduling PDSCH/PUSCH on any carriers that are configured for simultaneous PUCCH-PUSCH (e.g., priority indication may be disabled on carriers configured for simultaneous PUCCH-PUSCH or on all carriers when simultaneous PUCCH-PUSCH is configured). In such an example, UE 115-*a* may not expect to be configured with a priority indication field in DCI(s) scheduling PDSCH/PUSCH on any carriers if configured with simultaneous PUCCH-PUSCH.

As another example, whenever a PUSCH on a data-only uplink carrier is scheduled, any overlapping PUCCH/PUSCH in the other carrier(s) may have the same priority index as the PUSCH on the data-only uplink carrier. In such an example, as the priority index is the same across overlapped uplink transmissions, overlapped PUSCH/PUCCH transmissions with the same priority index across uplink carriers may be resolved. Various additional techniques for priority handling of overlapping scheduled transmissions are described herein, for example, with reference to FIGS. 3 through 6 below.

Further, in some cases, wireless communications system 200 may specify or adhere to criteria for when simultaneous PUCCH-PUSCH may be configured. For example, in some cases, simultaneous PUCCH-PUSCH may not be configured together with two cell-groups/PUCCH-groups (e.g., to avoid simultaneous transmissions of PUCCH+PUSCH+PUCCH+PUSCH across uplink carriers, which may result in new UE behaviors on power allocation across uplink transmissions). In other examples, simultaneous PUCCH-PUSCH may be configured together with two cell-groups/PUCCH-groups, however the combination of UE transmissions may be limited. For instance, two PUCCHs, one PUCCH+one/multiple PUSCHs, two/multiple PUSCHs, etc. may be allowed (e.g., may be configured within wireless communications system 200). However, two PUCCHs+one/multiple PUSCHs may not be allowed (e.g., may not be configured within wireless communications system 200).

Figure 3:
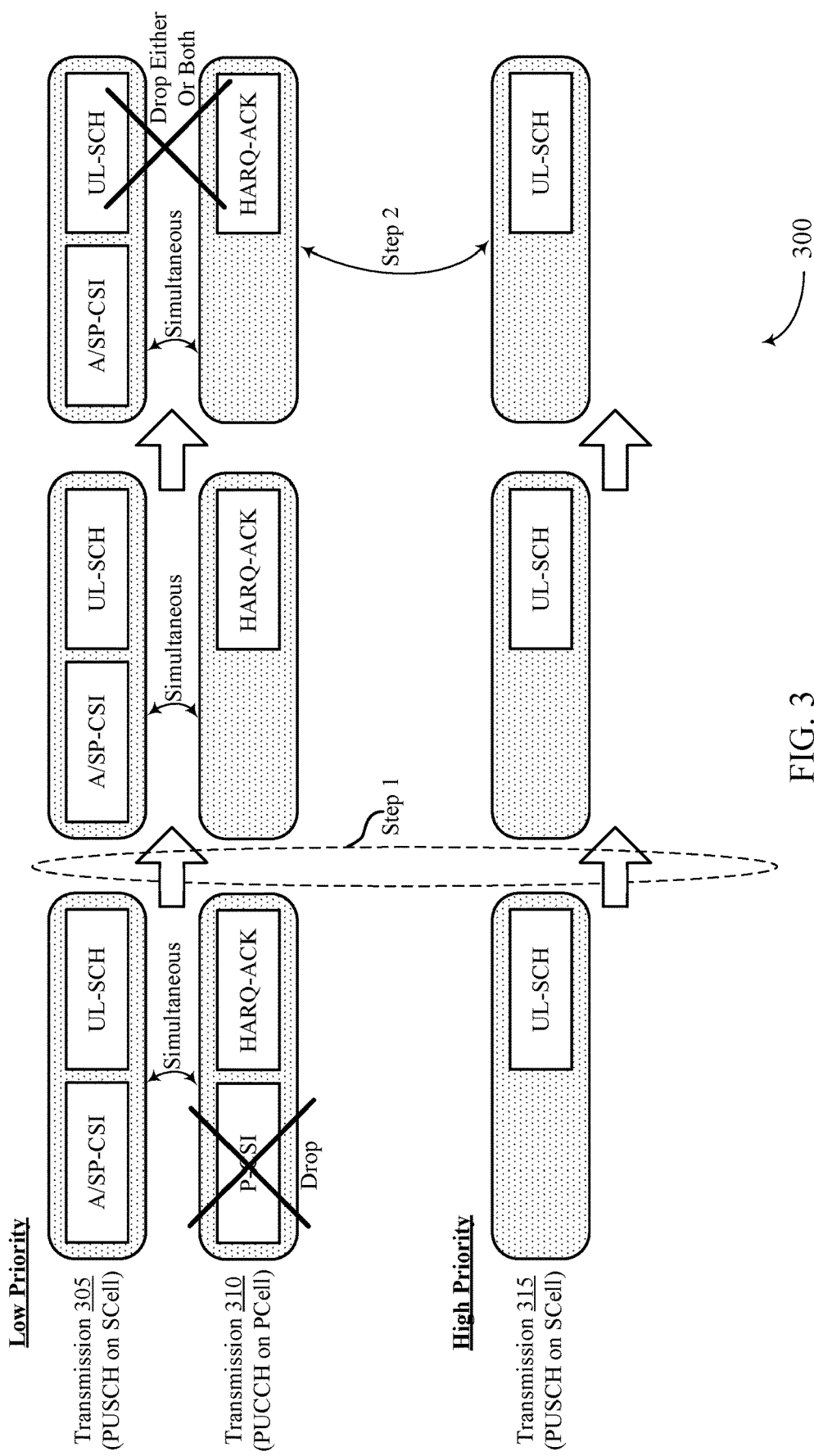
FIGS. 3 through 5 illustrate examples of simultaneous PUCCH-PUSCH transmission diagrams that support simultaneous PUCCH-PUSCH with different priorities in accordance with aspects of the present disclosure.

FIG. 3 illustrates an example of a simultaneous PUCCH-PUSCH transmission diagram 300 that supports simultaneous PUCCH-PUSCH with different priorities in accordance with aspects of the present disclosure. In some examples, simultaneous PUCCH-PUSCH transmission diagram 300 may implement aspects of wireless communications system 100 and/or wireless communications system 200. Simultaneous PUCCH-PUSCH transmission diagram 300 may illustrate techniques for simultaneous PUCCH-PUSCH priority handling (e.g., where simultaneous PUCCH-PUSCH transmission is determined in Step 1 before handling different priorities).

For example, when a UE is configured with a priority index field in the DCI, simultaneous PUCCH-PUSCH transmission may be determined in Step 1 before handling different priorities. In Step 1, a UE may resolve overlapped PUSCH/PUCCH transmissions with the same priority index across UL carriers and may make a determination of simultaneous PUCCH-PUSCH according to the procedures described herein. Simultaneous PUCCH-PUSCH may occur as a consequence of Step 1 for a given priority index. For instance, in the example of FIG. 3, simultaneous transmission 305 and transmission 310 (e.g., simultaneous PUCCH-PUSCH) may occur as a consequence of Step 1 for a low priority index. In Step 2, a UE may compare overlapping transmissions (e.g., simultaneous transmission 305 and transmission 310 that overlaps with transmission 315), and the UE may select the transmission 315 with high priority (e.g., and the UE may drop transmission 305, transmission 310, or both). Generally, Table 2 may illustrate priority handling in example scenarios where simultaneous PUCCH-PUSCH occurs as a result of Step 1.

TABLE 2

| Overlapping Scheduled Transmissions | Priority Handling Behavior |
| --- | --- |
| Simultaneous PUCCH-PUCCH with high priority vs PUSCH with low priority or PUCCH with low priority | Drop the PUSCH with low priority or the PUCCH with low priority |
| PUSCH with high priority or PUCCH with high priority vs simultaneous PUCCH-PUSCH with low priority | Drop both PUCCH and PUSCH of the simultaneous PUCCH-PUSCH with low priority, or; Drop either PUCCH or PUSCH of the simultaneous PUCCH-PUSCH with low priority |
| Simultaneous PUCCH-PUSCH with high priority vs simultaneous PUCCH-PUSCH with low priority | Drop both PUCCH and PUSCH of the simultaneous PUCCH-PUSCH with low priority, or; Drop either PUCCH or PUSCH of the simultaneous PUCCH-PUSCH with low priority |

Figure 4:
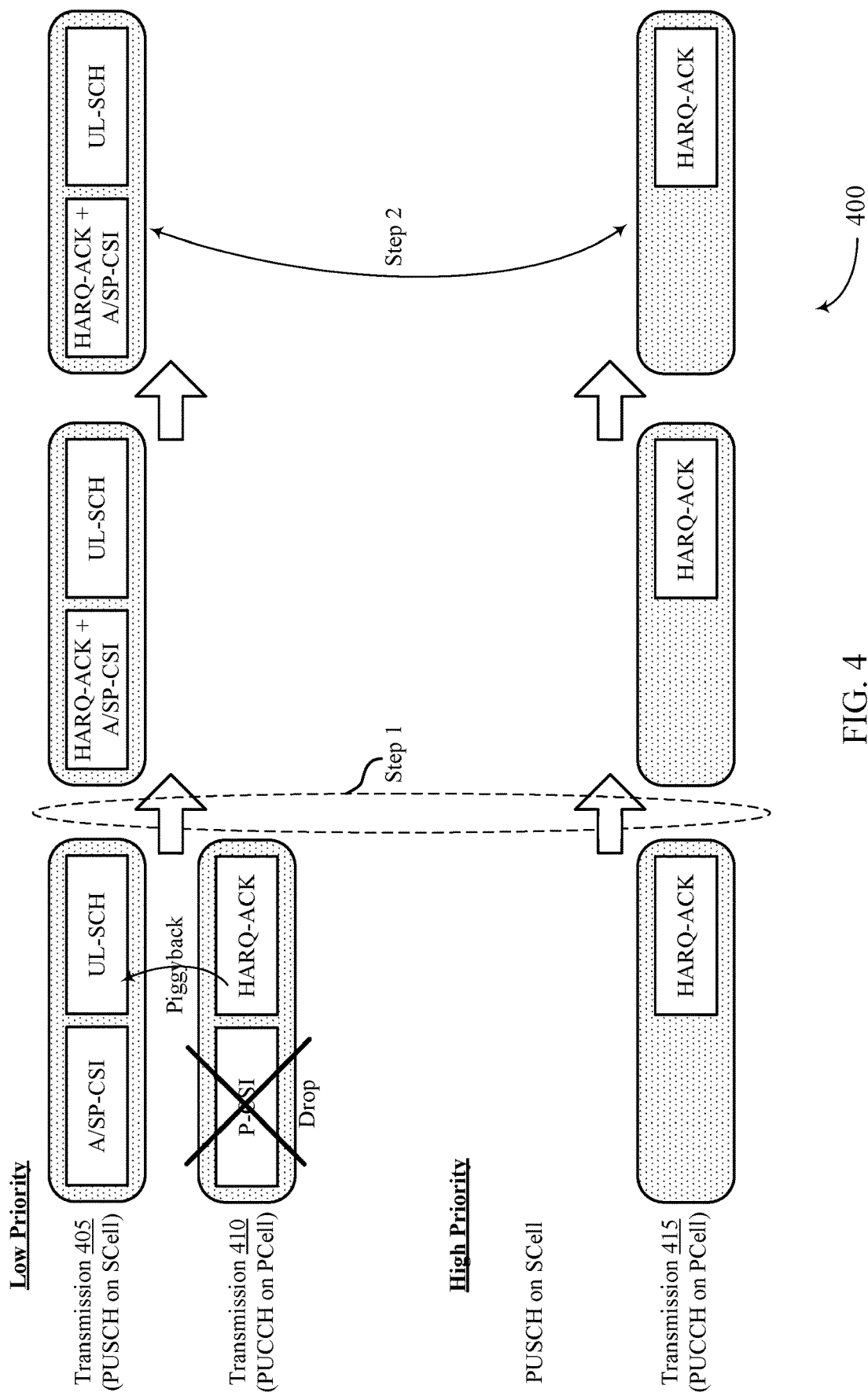

FIG. 4 illustrates an example of a simultaneous PUCCH-PUSCH transmission diagram 400 that supports simultaneous PUCCH-PUSCH with different priorities in accordance with aspects of the present disclosure. In some examples, simultaneous PUCCH-PUSCH transmission diagram 400 may implement aspects of wireless communications system 100 and/or wireless communications system 200. Simultaneous PUCCH-PUSCH transmission diagram 400 may illustrate techniques for simultaneous PUCCH-PUSCH priority handling (e.g., where simultaneous PUCCH-PUSCH transmission is determined in Step 2 after resolving PUCCH/PUSCH for each priority index).

For example, when a UE is configured with a priority index field in the DCI, simultaneous PUCCH-PUSCH transmission may be determined in Step 2 after resolving PUCCH/PUSCH for each priority index. In Step 1, a UE may resolve overlapped PUSCH/PUCCH transmissions with the same priority index. For example, a UE may resolve overlapped transmission 405 and transmission 410 (e.g., UE may resolve transmissions for a low priority index), where HARQ-ACK of transmission 410 may be piggybacked on transmission 405. As such, simultaneous PUCCH-PUSCH may not occur as a consequence of Step 1 for a given priority index.

In Step 2, PUCCH and PUSCH across carriers with different priority indexes may be transmitted. For example, if a PUCCH with a first priority index and a PUSCH with a second priority index that is different from the first priority index occurs, the PUCCH and the PUSCH may be simultaneously transmitted if they are on different carriers, or either PUCCH or PUSCH with lower priority index may be dropped (e.g., not transmitted) if they are on the same carrier. In the example of FIG. 4, transmission 405 and transmission 415 may be simultaneously transmitted as a result of Step 2.

Figure 5:
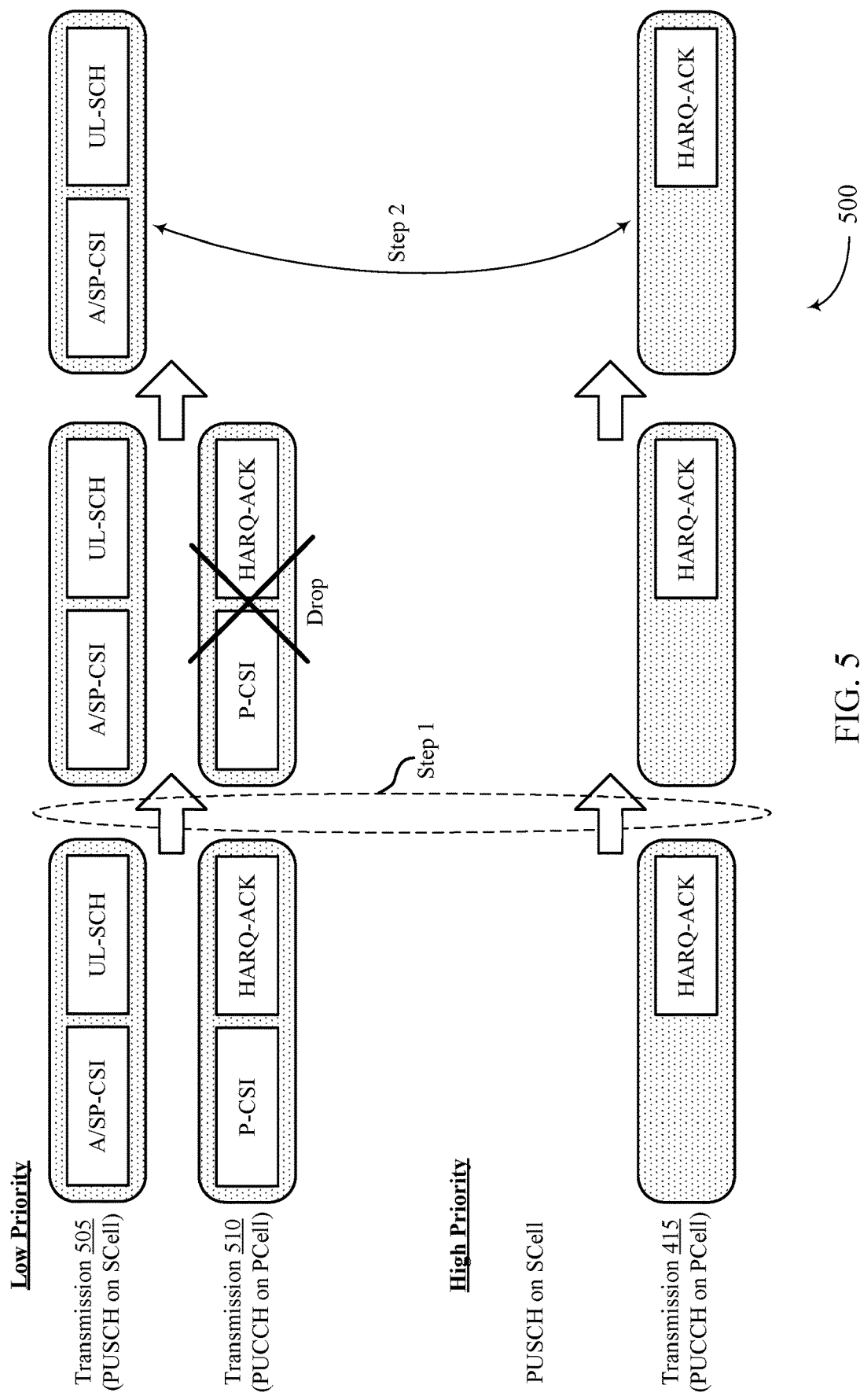

FIG. 5 illustrates an example of a simultaneous PUCCH-PUSCH transmission diagram 500 that supports simultaneous PUCCH-PUSCH with different priorities in accordance with aspects of the present disclosure. In some examples, simultaneous PUCCH-PUSCH transmission diagram 500 may implement aspects of wireless communications system 100 and/or wireless communications system 200. Simultaneous PUCCH-PUSCH transmission diagram 500 may illustrate techniques for simultaneous PUCCH-PUSCH priority handling (e.g., where irrespective of whether the same priority or different priorities, as long as PUCCH and PUSCH are in different frequency bands, or in different frequency ranges, they are simultaneously transmitted).

For example, when a UE is configured with a priority index field in the DCI, irrespective of priority (e.g., regardless of whether transmissions have the same priority or different priorities), as long as PUCCH and PUSCH are in different frequency bands (e.g., or are in different frequency ranges), they are simultaneously transmitted. If they are in the same frequency bands (or in the same frequency range), priority handling techniques for dropping transmissions in the same frequency bands may be employed (e.g., for PUCCH and PUSCH in the same frequency bands or same frequency range, Step 1 and Step 2 may be carried out). In the example of FIG. 5, in Step 1 a UE may jointly check overall PUCCH and PUSCH transmissions with different priorities where transmission 510 may be dropped. In Step 2, a UE may transmit PUCCH with high priority+PUSCH on SCell with low priority as long as they are in different bands (e.g., a UE may transmit transmission 505 and transmission 515 simultaneously as long as they are in different bands).

Figure 6:
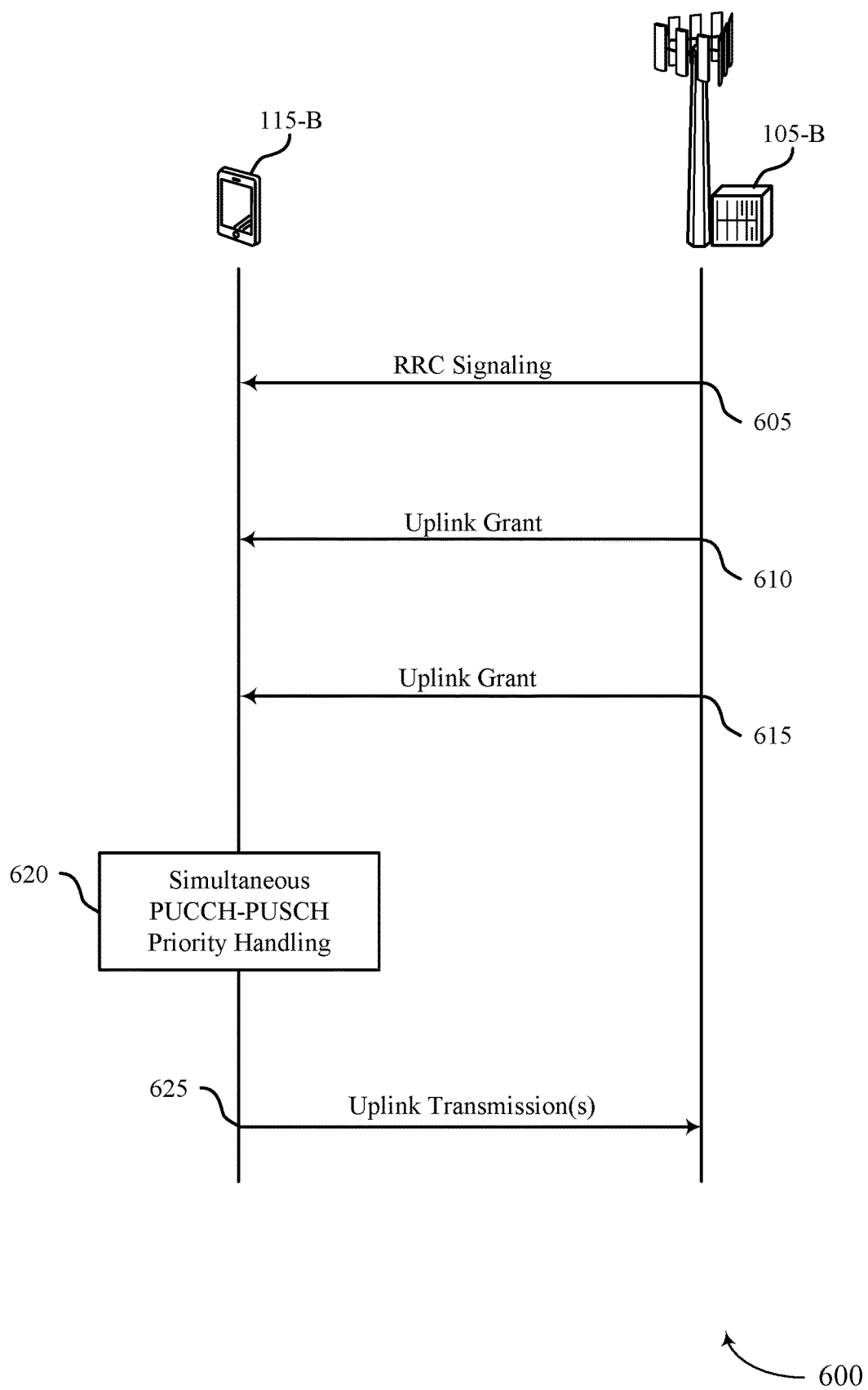
FIG. 6 illustrates an example of a process flow that supports simultaneous PUCCH-PUSCH with different priorities in accordance with aspects of the present disclosure.

FIG. 6 illustrates an example of a process flow 600 that supports simultaneous PUCCH-PUSCH with different priorities in accordance with aspects of the present disclosure. In some examples, process flow 600 may implement aspects of wireless communications system 100 and/or wireless communications system 200. Further, process flow 600 may be implemented by a UE 115-*b* and a base station 105-*b*, which may be examples of a UE 115 and a base station 105 described with reference to FIGS. 1-2. In the following description of the process flow 600, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 600, or other operations may be added to the process flow 600. It is to be understood that while base station 105-*b* and UE 115-*b* are shown performing a number of the operations of process flow 600, any wireless device may perform the operations shown.

At 605, base station 105-*b* may transmit RRC signaling to UE 115-*b*. The RRC signaling may include a feedback information piggybacking status for a first uplink carrier of a plurality of uplink carriers configured for the UE 115-*b*.

At 610, base station 105-*b* may transmit, to UE 115-*b*, a first uplink grant that indicates a first uplink channel transmission occasion and a first priority index for a first uplink transmission on the first uplink carrier.

At 615, base station 105-*b* may transmit, to UE 115-*b*, a second uplink grant that indicates a second uplink channel transmission occasion that at least partially overlaps in time with the first uplink channel transmission occasion.

At 620, UE 115-*b* may perform priority handling, simultaneous PUCCH-PUSCH determination, etc. in accordance with one or more aspects of the techniques described herein. For example, in some cases, UE 115-*b* may identify a priority of the first uplink transmission and the second uplink transmission based on the first priority index and the second uplink channel transmission occasion at least partially overlapping in time with the first uplink channel transmission occasion, where the first uplink transmission, the second uplink transmission, or both are performed based on the priority. In other words, whenever a PUSCH on a data only uplink carrier is scheduled, any overlapping PUCCH/PUSCH in the other carrier(s) may have the same priority index as the PUSCH on the data only uplink carrier.

In other examples, UE 115-*b* may receive the second uplink grant that indicates the second uplink channel transmission occasion and a second priority index for the second uplink transmission, where the first uplink transmission, the second uplink transmission, or both are performed based at least in part on the first priority index, the second priority index, and the feedback information piggybacking status. In other words, uplink grants for overlapping transmissions may include the same or different priority indications in DCI.

In some examples, UE 115-*b* may identify an uplink control channel occasion that at least partially overlaps in time with the first uplink channel transmission occasion based on the first uplink grant, and UE 115-*b* may perform or drop an uplink control transmission during the uplink control channel occasion based on the first priority index, the second priority index, the feedback information piggybacking status, or some combination thereof (e.g., as described in more detail herein, for example, with reference to Step 1 of FIG. 3). In some cases, UE 115-*b* may drop the second uplink transmission based on the second priority index being associated with a lower priority than the first priority index, where the first uplink transmission and the uplink control transmission are performed based on the dropping of the second uplink transmission. In other cases, UE 115-*b* may drop the first uplink transmission, the uplink control transmission, or both based on the first priority index being associated with a lower priority than the second priority index, where the second uplink transmission is performed based on the dropping of the first uplink transmission, the uplink control transmission, or both (e.g., as described in more detail herein, for example, with reference to Step 2 of FIG. 3).

In some examples, UE 115-*b* may identify a second uplink control channel occasion that at least partially overlaps in time with the second uplink channel transmission occasion based on the second uplink grant, and the UE 115-*b* may determine the second uplink transmission is associated with a second uplink carrier based on the second grant, where the second uplink carrier is different from the first uplink carrier, and where the first uplink transmission and the second uplink transmission are performed based on the feedback information piggybacking status for the first uplink carrier and the second uplink carrier being different from the first uplink carrier (e.g., as described in more detail herein, for example, with reference to Step 2 of FIG. 4).

In some examples, UE 115-*b* may determine the first uplink transmission is associated with a first frequency band and the uplink control transmission is associated with a second frequency band, where the first uplink transmission and the uplink control transmission are performed based on the first frequency band being different than the second frequency band (e.g., as described in more detail herein, for example, with reference to FIG. 5). Various other examples of possible simultaneous PUCCH-PUSCH priority handling techniques at 620 are described throughout the present disclosure.

At 625, UE 115-*b* may perform, based on simultaneous PUCCH-PUSCH priority handling techniques at 620 (e.g., based at least in part on the feedback information piggybacking status for the first uplink carrier and the first priority index), a first uplink transmission on the first uplink carrier during the first uplink channel transmission occasion, a second uplink transmission during the second uplink channel transmission occasion, or both. According to the various examples described herein, generally, the first uplink channel transmission may refer to a PUSCH transmission, a PUCCH transmission, etc., and the second uplink transmission may generally refer to a PUSCH transmission, a PUCCH transmission, etc.

Figure 7:
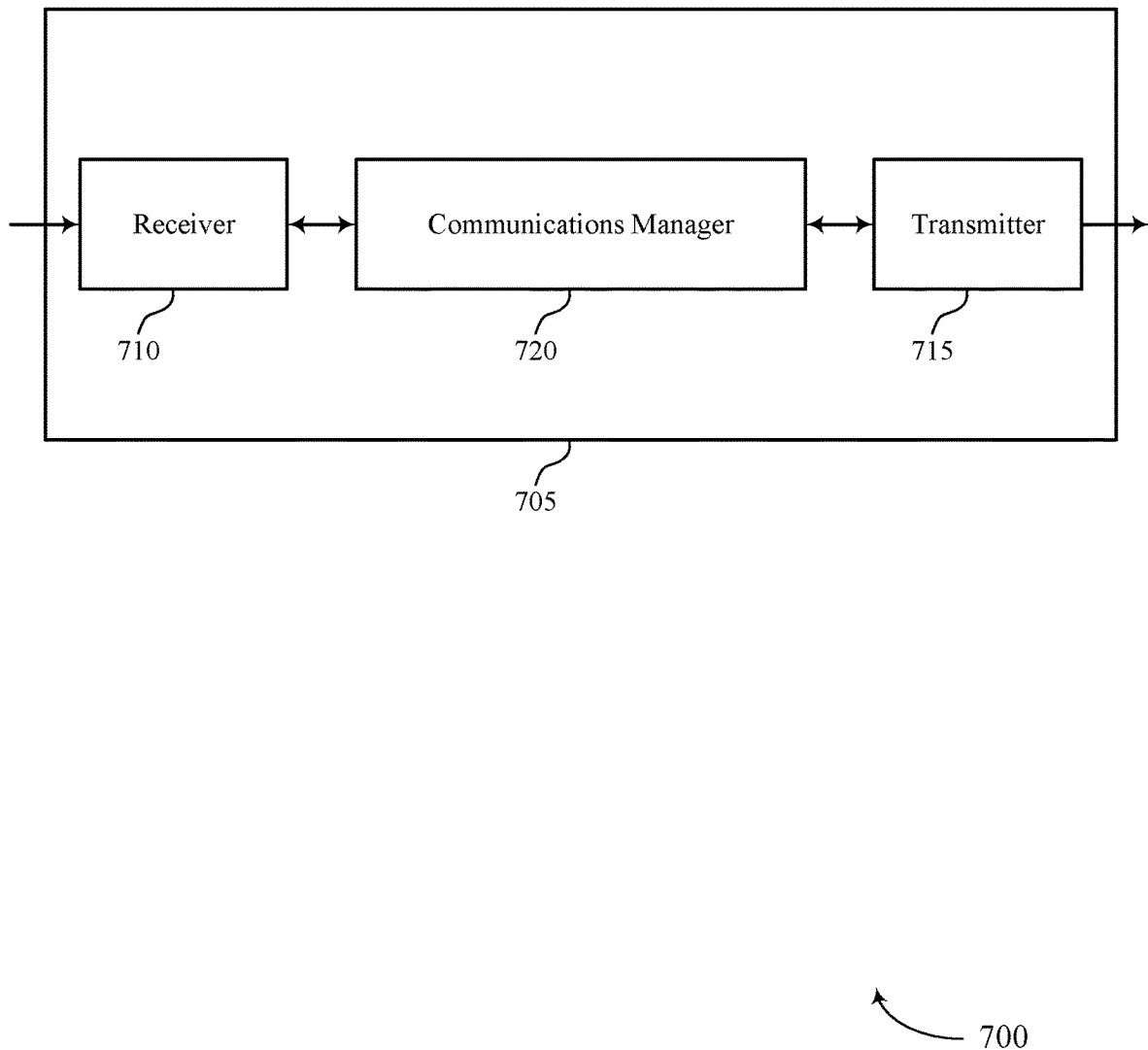
FIGS. 7 and 8 show block diagrams of devices that support simultaneous PUCCH-PUSCH with different priorities in accordance with aspects of the present disclosure.

FIG. 7 shows a block diagram 700 of a device 705 that supports simultaneous PUCCH-PUSCH with different priorities in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to simultaneous PUCCH-PUSCH with different priorities, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a feedback information piggybacking status for a first uplink carrier of a set of uplink carriers configured for the UE, receive a first uplink grant that indicates a first uplink channel transmission occasion and a first priority index for a first uplink transmission on the first uplink carrier, receive a second uplink grant that indicates a second uplink channel transmission occasion that at least partially overlaps in time with the first uplink channel transmission occasion, and perform, based on the feedback information piggybacking status for the first uplink carrier and the first priority index, the first uplink transmission on the first uplink carrier during the first uplink channel transmission occasion, a second uplink transmission during the second uplink channel transmission occasion, or both. The communications manager 715 may be an example of aspects of the communications manager 1010 described herein.

The communications manager 715 may implement one or more aspects of the techniques described herein for improved handling of control information (e.g., improved HARQ procedures), improved data throughput (e.g., on PUSCH), etc. For example, the communications manager 715 may receive a feedback information piggybacking status for a first uplink carrier and may more efficiently utilize the first uplink carrier for data only PUSCH, which may improve data throughput of the communications manager 715. Further, the communications manager 715 may implement one or more aspects of the techniques described herein for efficient handling of priority indications associated with scheduled transmissions that overlap when simultaneous PUCCH-PUSCH is supported (e.g., such that the communications manager 715 may efficiently configure or drop scheduled transmissions for improved performance of communications by the device 705). This improved performance may include increased reliability and signaling efficiency, resulting in improved throughput, reduced power consumption, and a reduction in signaling complexity.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
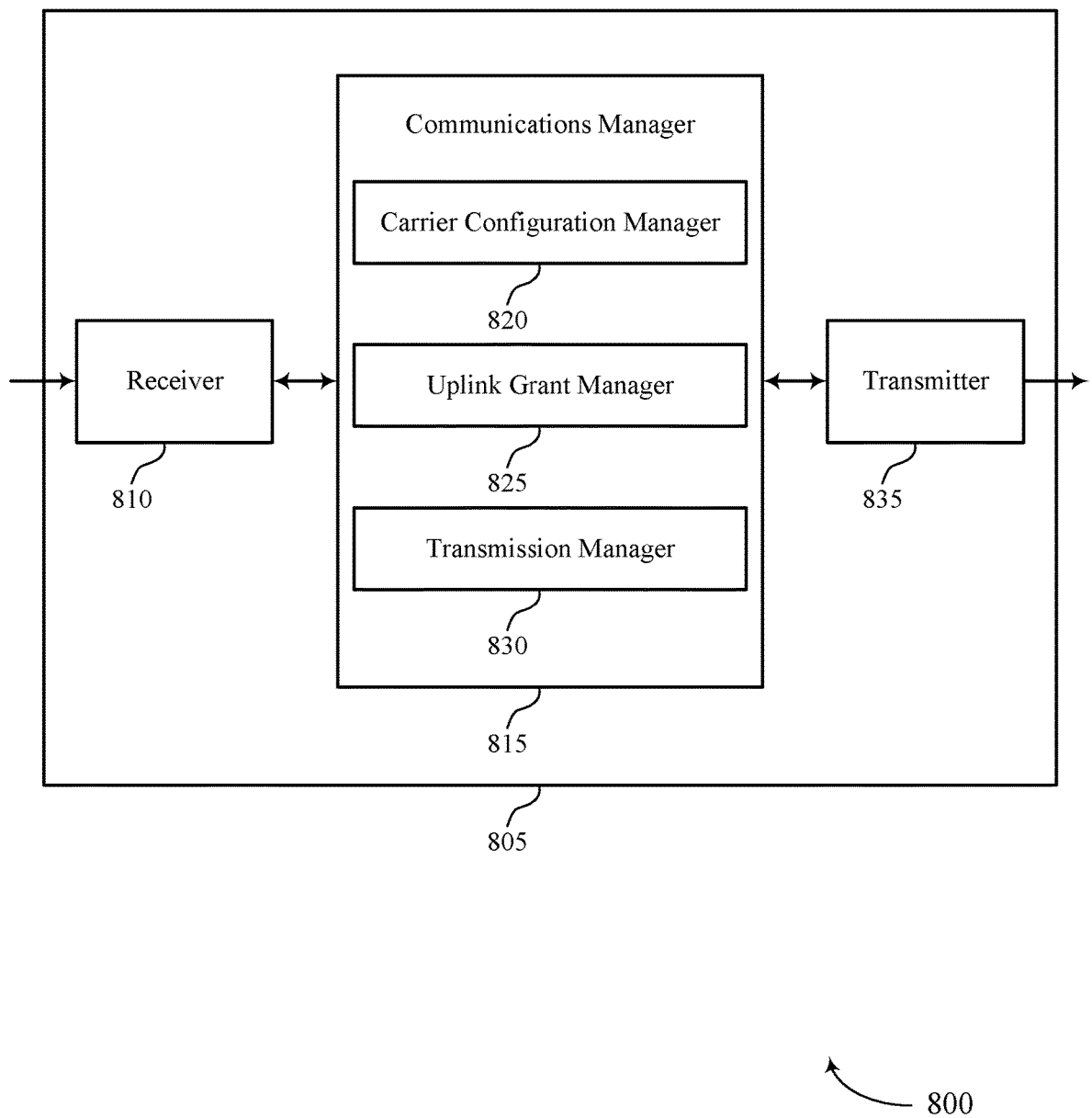

FIG. 8 shows a block diagram 800 of a device 805 that supports simultaneous PUCCH-PUSCH with different priorities in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to simultaneous PUCCH-PUSCH with different priorities, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a carrier configuration manager 820, an uplink grant manager 825, and a transmission manager 830. The communications manager 815 may be an example of aspects of the communications manager 1010 described herein.

The carrier configuration manager 820 may receive a feedback information piggybacking status for a first uplink carrier of a set of uplink carriers configured for the UE.

The uplink grant manager 825 may receive a first uplink grant that indicates a first uplink channel transmission occasion and a first priority index for a first uplink transmission on the first uplink carrier and receive a second uplink grant that indicates a second uplink channel transmission occasion that at least partially overlaps in time with the first uplink channel transmission occasion.

The transmission manager 830 may perform, based on the feedback information piggybacking status for the first uplink carrier and the first priority index, the first uplink transmission on the first uplink carrier during the first uplink channel transmission occasion, a second uplink transmission during the second uplink channel transmission occasion, or both.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
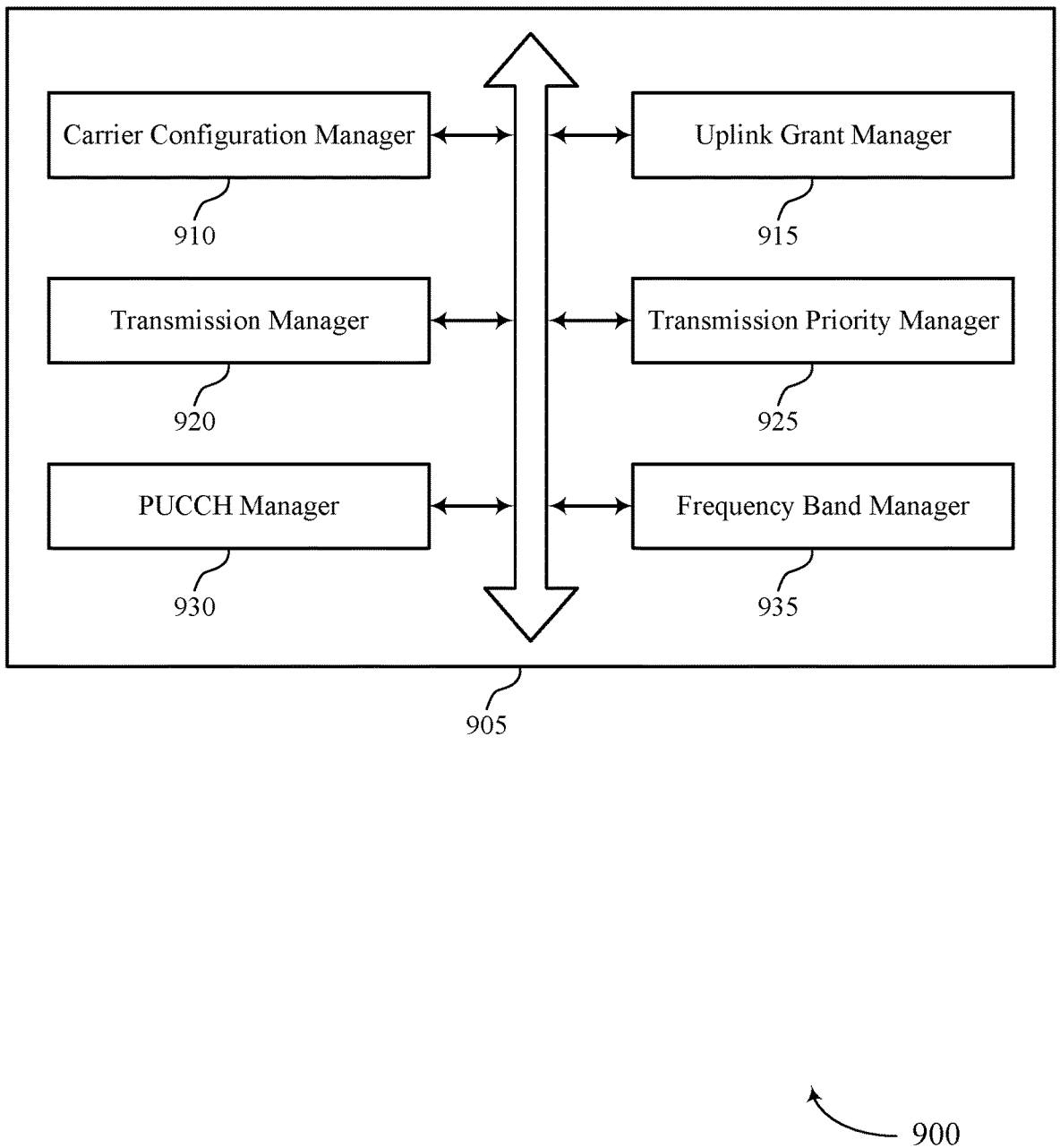
FIG. 9 shows a block diagram of a communications manager that supports simultaneous PUCCH-PUSCH with different priorities in accordance with aspects of the present disclosure.

FIG. 9 shows a block diagram 900 of a communications manager 905 that supports simultaneous PUCCH-PUSCH with different priorities in accordance with aspects of the present disclosure. The communications manager 905 may be an example of aspects of a communications manager 715, a communications manager 815, or a communications manager 1010 described herein. The communications manager 905 may include a carrier configuration manager 910, an uplink grant manager 915, a transmission manager 920, a transmission priority manager 925, a PUCCH manager 930, and a frequency band manager 935. Each of these modules may communicate, directly or indirectly, with one another (e.g., via one or more buses).

The carrier configuration manager 910 may receive a feedback information piggybacking status for a first uplink carrier of a set of uplink carriers configured for the UE.

The uplink grant manager 915 may receive a first uplink grant that indicates a first uplink channel transmission occasion and a first priority index for a first uplink transmission on the first uplink carrier.

In some examples, the uplink grant manager 915 may receive a second uplink grant that indicates a second uplink channel transmission occasion that at least partially overlaps in time with the first uplink channel transmission occasion.

The transmission manager 920 may perform, based on the feedback information piggybacking status for the first uplink carrier and the first priority index, the first uplink transmission on the first uplink carrier during the first uplink channel transmission occasion, a second uplink transmission during the second uplink channel transmission occasion, or both. In some examples, the transmission manager 920 may perform or drop an uplink control transmission during the uplink control channel occasion based on the first priority index, the second priority index, the feedback information piggybacking status, or some combination thereof. In some examples, the transmission manager 920 may determine the second uplink transmission is associated with a second uplink carrier based on the second grant, where the second uplink carrier is different from the first uplink carrier. In some examples, the transmission manager 920 may determine the second uplink transmission is associated with the first uplink carrier based on the second grant.

In some examples, the transmission manager 920 may perform the first uplink transmission during the first uplink channel transmission occasion, the second uplink transmission during the second uplink channel transmission occasion, a first uplink control transmission during the first uplink control channel occasion, a second uplink control transmission during the second uplink control channel occasion, or some combination thereof based on the feedback information piggybacking status.

In some cases, the first uplink transmission and the second uplink transmission are performed based on the feedback information piggybacking status for the first uplink carrier and the second uplink carrier being different from the first uplink carrier. In some cases, the first uplink transmission and the first uplink control transmission are configured on a first cell group and the second uplink transmission and the second uplink control transmission are configured on a second cell group.

The transmission priority manager 925 may identify a priority of the first uplink transmission and the second uplink transmission based on the first priority index and the second uplink channel transmission occasion at least partially overlapping in time with the first uplink channel transmission occasion, where the first uplink transmission, the second uplink transmission, or both are performed based on the priority. In some examples, the transmission priority manager 925 may receive the second uplink grant that indicates the second uplink channel transmission occasion and a second priority index for the second uplink transmission, where the first uplink transmission, the second uplink transmission, or both are performed based on the first priority index, the second priority index, and the feedback information piggybacking status.

In some examples, the transmission priority manager 925 may drop the second uplink transmission based on the second priority index being associated with a lower priority than the first priority index, where the first uplink transmission and the uplink control transmission are performed based on the dropping of the second uplink transmission. In some examples, the transmission priority manager 925 may drop the first uplink transmission, the uplink control transmission, or both based on the first priority index being associated with a lower priority than the second priority index, where the second uplink transmission is performed based on the dropping of the first uplink transmission, the uplink control transmission, or both.

In some examples, the transmission priority manager 925 may drop the second uplink transmission, a second uplink control transmission during the second uplink control channel occasion, or both based on the second priority index being associated with a lower priority than the first priority index, where the first uplink transmission and the uplink control transmission are performed based on the dropping of the second uplink transmission, the second uplink control transmission, or both.

In some examples, the transmission priority manager 925 may drop the second uplink transmission based on the second priority index being associated with a lower priority than the first priority index and the second uplink transmission being associated with the first carrier, where the first uplink transmission is performed based on the dropping of the second uplink transmission.

In some examples, the transmission priority manager 925 may drop the first uplink transmission or the second uplink transmission based on the first uplink transmission and the second uplink transmission being associated with the first frequency band, where the first uplink transmission or the second uplink transmission are performed based on the dropping of the first uplink transmission or the second uplink transmission.

In some cases, the first uplink transmission or the second uplink transmission is dropped based on the first priority index, the second priority index, and the feedback information piggybacking status.

The PUCCH manager 930 may identify an uplink control channel occasion at least partially overlaps in time with the first uplink channel transmission occasion based on the first uplink grant. In some examples, the PUCCH manager 930 may identify a second uplink control channel occasion at least partially overlaps in time with the second uplink channel transmission occasion based on the second uplink grant. In some examples, the PUCCH manager 930 may identify a first uplink control channel occasion at least partially overlaps in time with the first uplink channel transmission occasion based on the first uplink grant.

The frequency band manager 935 may determine the first uplink transmission is associated with a first frequency band. In some examples, the frequency band manager 935 may determine the uplink control transmission is associated with a second frequency band, where the first uplink transmission and the uplink control transmission are performed based on the first frequency band being different than the second frequency band. In some examples, the frequency band manager 935 may determine the uplink control transmission is associated with a first frequency band. In some examples, the frequency band manager 935 may determine the second uplink transmission is associated with a second frequency band, where the uplink control transmission and the second uplink transmission are performed based on the first frequency band being different than the second frequency band.

In some examples, the frequency band manager 935 may determine the first uplink transmission is associated with a first frequency band. In some examples, the frequency band manager 935 may determine the second uplink transmission is associated with the first frequency band.

Figure 10:
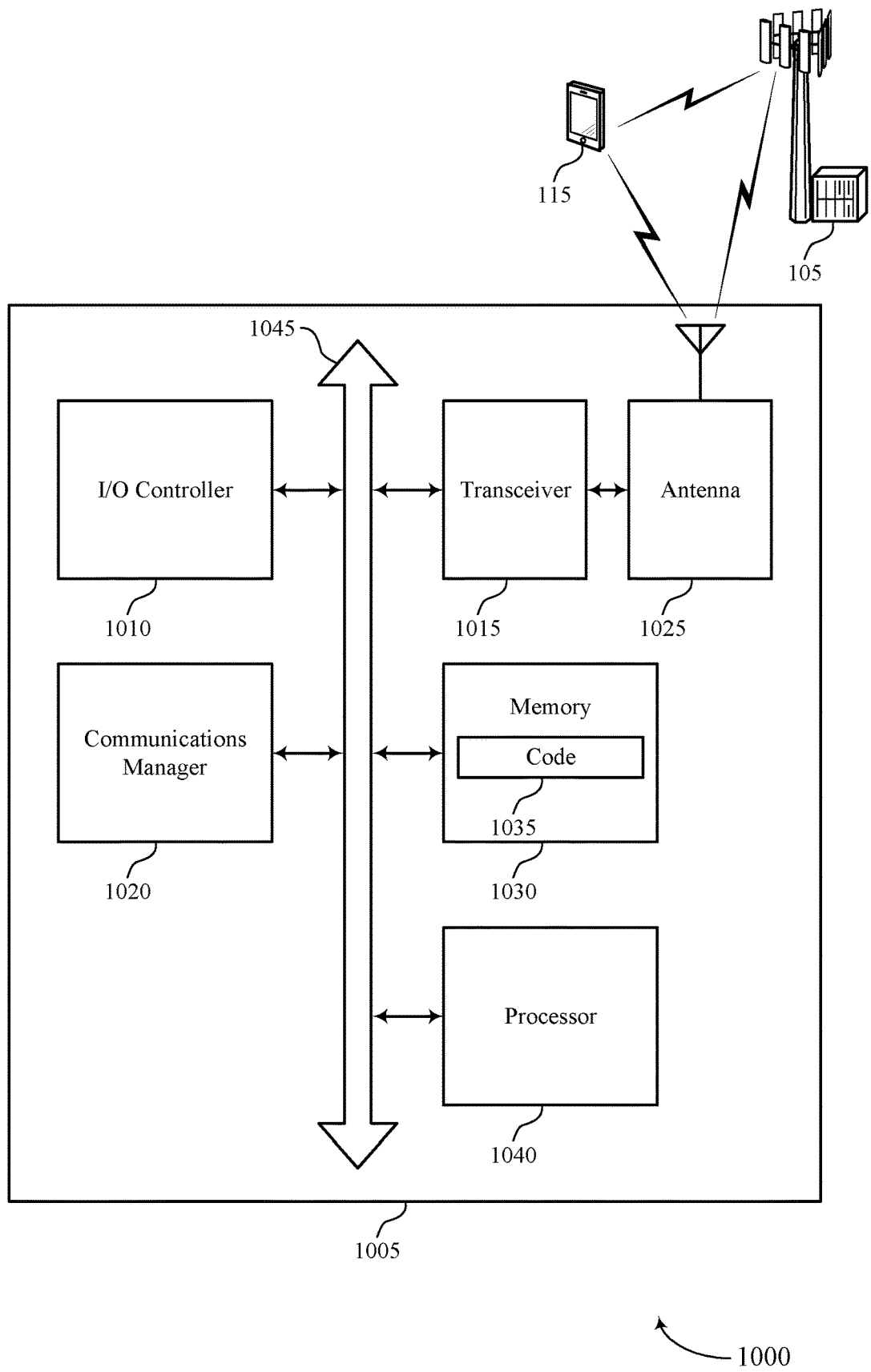
FIG. 10 shows a diagram of a system including a device that supports simultaneous PUCCH-PUSCH with different priorities in accordance with aspects of the present disclosure.

FIG. 10 shows a diagram of a system 1000 including a device 1005 that supports simultaneous PUCCH-PUSCH with different priorities in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a feedback information piggybacking status for a first uplink carrier of a set of uplink carriers configured for the UE, receive a first uplink grant that indicates a first uplink channel transmission occasion and a first priority index for a first uplink transmission on the first uplink carrier, receive a second uplink grant that indicates a second uplink channel transmission occasion that at least partially overlaps in time with the first uplink channel transmission occasion, and perform, based on the feedback information piggybacking status for the first uplink carrier and the first priority index, the first uplink transmission on the first uplink carrier during the first uplink channel transmission occasion, a second uplink transmission during the second uplink channel transmission occasion, or both.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code or software 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include a hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting simultaneous PUCCH-PUSCH with different priorities).

The software 1035 may include instructions to implement aspects of the present disclosure, including instructions to support wireless communications. The software 1035 may be stored in a non-transitory computer-readable medium such as system memory or other type of memory. In some cases, the software 1035 may not be directly executable by the processor 1040 but may cause a computer (e.g., when compiled and executed) to perform functions described herein.

Device 1005 may implement one or more aspects of the techniques described herein for improved handling of control information (e.g., improved HARQ procedures), improved data throughput (e.g., on PUSCH), etc. For example, the device 1005 may receive a feedback information piggybacking status for a first uplink carrier and may more efficiently utilize the first uplink carrier for data only PUSCH, which may improve data throughput of uplink communications by the device 1005. Further, the device 1005 may implement one or more aspects of the techniques described herein for efficient handling of priority indications associated with scheduled transmissions that overlap when simultaneous PUCCH-PUSCH is supported (e.g., such that the communications manager 1015 may efficiently configure transceiver 1020 to perform transmissions or such that communications manager 1015 may efficiently drop scheduled transmissions for improved performance of uplink communications by the device 1005). Based on implementing the techniques as described herein, the device may achieve better data throughput, reduced latency, reduced power consumption, improved battery life, and a better user experience.

Figure 11:
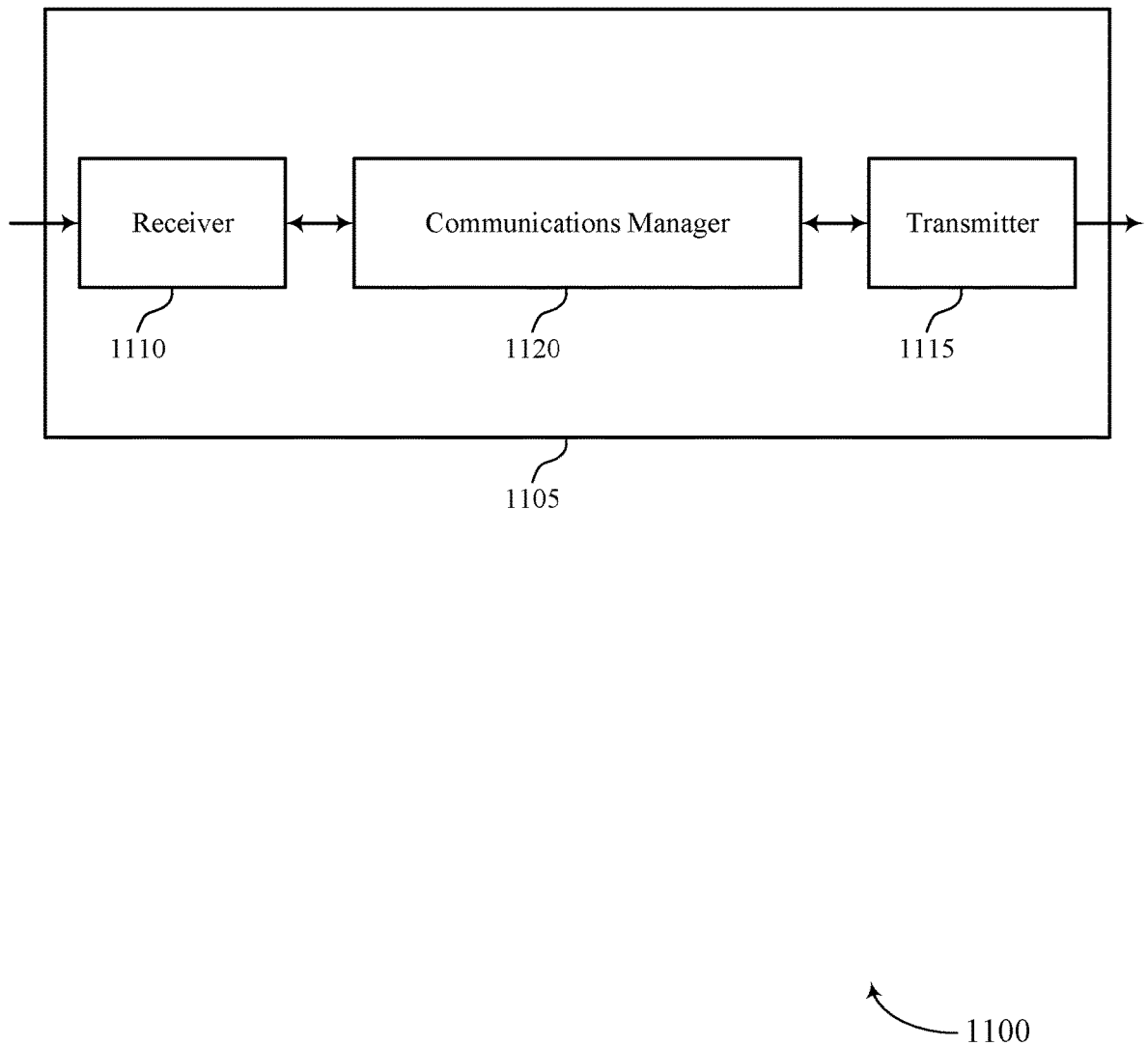
FIGS. 11 and 12 show block diagrams of devices that support simultaneous PUCCH-PUSCH with different priorities in accordance with aspects of the present disclosure.

FIG. 11 shows a block diagram 1100 of a device 1105 that supports simultaneous PUCCH-PUSCH with different priorities in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to simultaneous PUCCH-PUSCH with different priorities). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to simultaneous PUCCH-PUSCH with different priorities). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of simultaneous PUCCH-PUSCH with different priorities as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting a feedback information piggybacking status for a first uplink carrier of a set of multiple uplink carriers configured for a UE. The communications manager 1120 may be configured as or otherwise support a means for transmitting a first uplink grant that indicates a first uplink channel transmission occasion and a first priority index for a first uplink transmission on the first uplink carrier. The communications manager 1120 may be configured as or otherwise support a means for transmitting a second uplink grant that indicates a second uplink channel transmission occasion that at least partially overlaps in time with the first uplink channel transmission occasion. The communications manager 1120 may be configured as or otherwise support a means for receiving, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for improved handling of control information (e.g., improved HARQ procedures), improved data throughput (e.g., on PUSCH), etc. For example, the communications manager 1120 may transmit a feedback information piggybacking status for a first uplink carrier, which may improve data throughput. Further, the communications manager 1120 may receive (e.g., from a UE) transmissions in accordance with the techniques described herein, which may increase reliability and signaling efficiency, resulting in improved throughput, reduced power consumption, and a reduction in signaling complexity.

Figure 12:
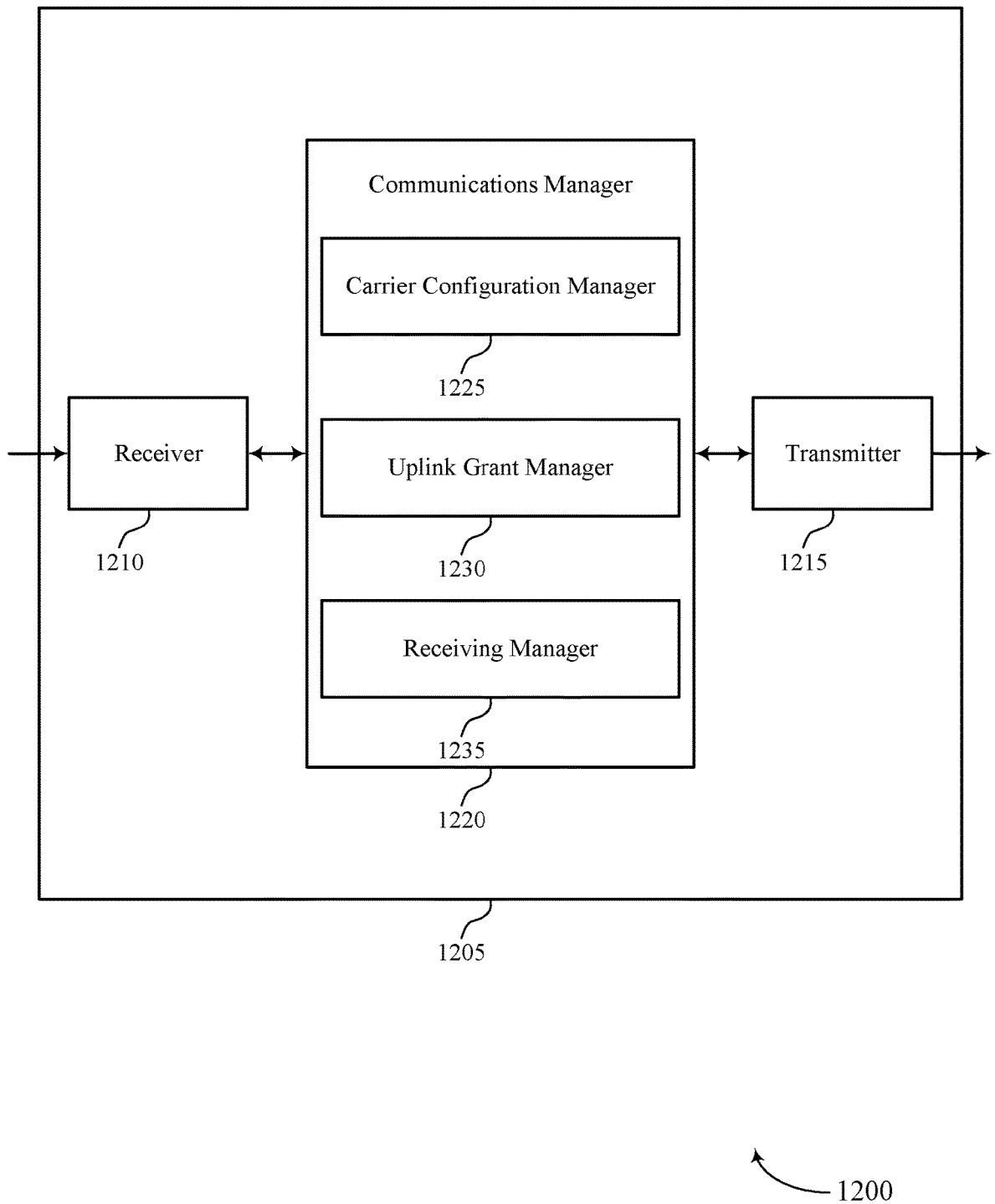

FIG. 12 shows a block diagram 1200 of a device 1205 that supports simultaneous PUCCH-PUSCH with different priorities in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to simultaneous PUCCH-PUSCH with different priorities). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to simultaneous PUCCH-PUSCH with different priorities). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of simultaneous PUCCH-PUSCH with different priorities as described herein. For example, the communications manager 1220 may include a carrier configuration manager 1225, an uplink grant manager 1230, a receiving manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The carrier configuration manager 1225 may be configured as or otherwise support a means for transmitting a feedback information piggybacking status for a first uplink carrier of a set of multiple uplink carriers configured for a UE. The uplink grant manager 1230 may be configured as or otherwise support a means for transmitting a first uplink grant that indicates a first uplink channel transmission occasion and a first priority index for a first uplink transmission on the first uplink carrier. The uplink grant manager 1230 may be configured as or otherwise support a means for transmitting a second uplink grant that indicates a second uplink channel transmission occasion that at least partially overlaps in time with the first uplink channel transmission occasion. The receiving manager 1235 may be configured as or otherwise support a means for receiving, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

Figure 13:
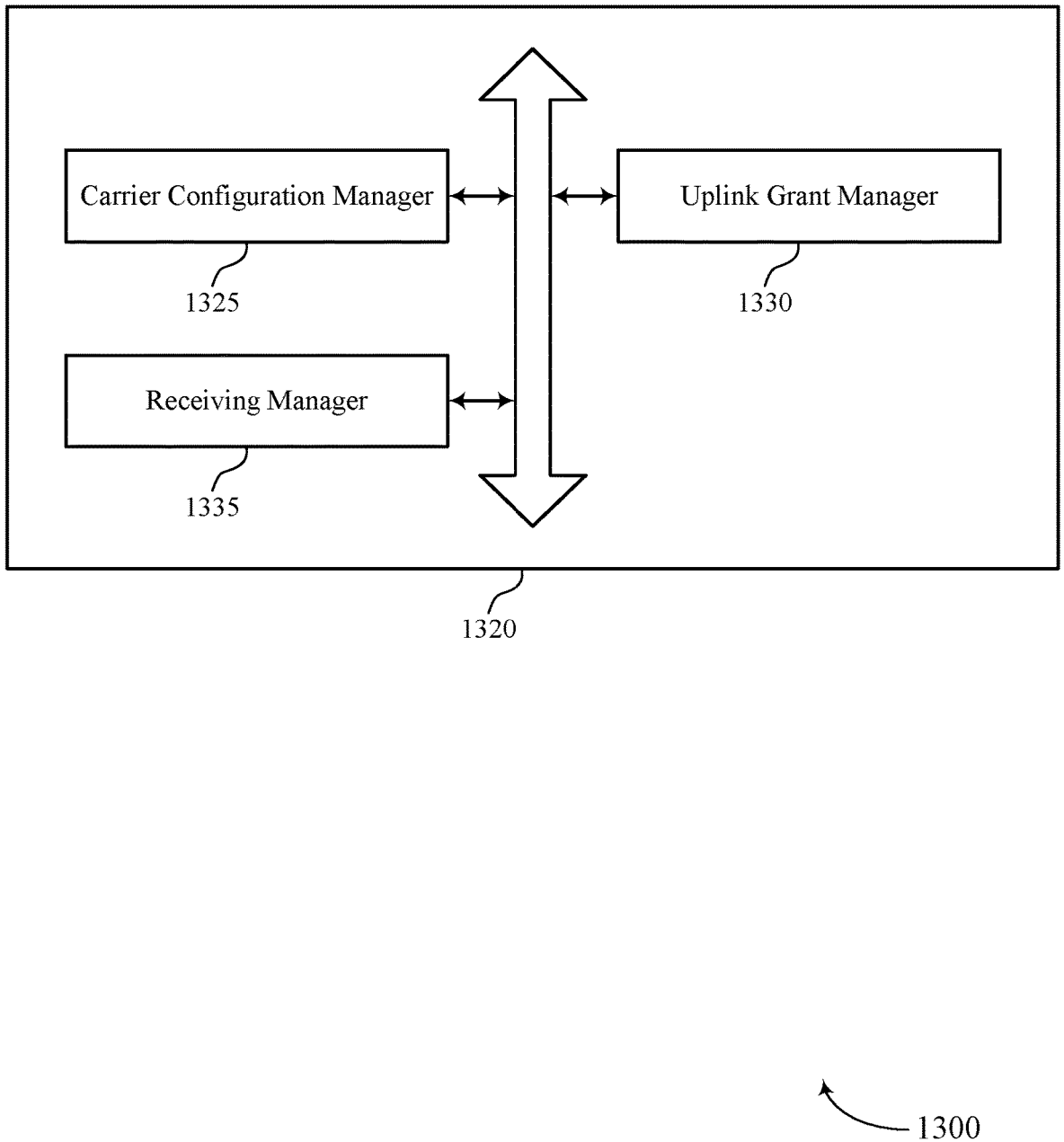
FIG. 13 shows a block diagram of a communications manager that supports simultaneous PUCCH-PUSCH with different priorities in accordance with aspects of the present disclosure.

FIG. 13 shows a block diagram 1300 of a communications manager 1320 that supports simultaneous PUCCH-PUSCH with different priorities in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of simultaneous PUCCH-PUSCH with different priorities as described herein. For example, the communications manager 1320 may include a carrier configuration manager 1325, an uplink grant manager 1330, a receiving manager 1335, or any combination thereof. Each of these components may communicate, directly or indirectly, with one another (e.g., via one or more buses).

The communications manager 1320 may support wireless communication at a base station in accordance with examples as disclosed herein. The carrier configuration manager 1325 may be configured as or otherwise support a means for transmitting a feedback information piggybacking status for a first uplink carrier of a set of multiple uplink carriers configured for a UE. The uplink grant manager 1330 may be configured as or otherwise support a means for transmitting a first uplink grant that indicates a first uplink channel transmission occasion and a first priority index for a first uplink transmission on the first uplink carrier. In some examples, the uplink grant manager 1330 may be configured as or otherwise support a means for transmitting a second uplink grant that indicates a second uplink channel transmission occasion that at least partially overlaps in time with the first uplink channel transmission occasion. The receiving manager 1335 may be configured as or otherwise support a means for receiving, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

Figure 14:
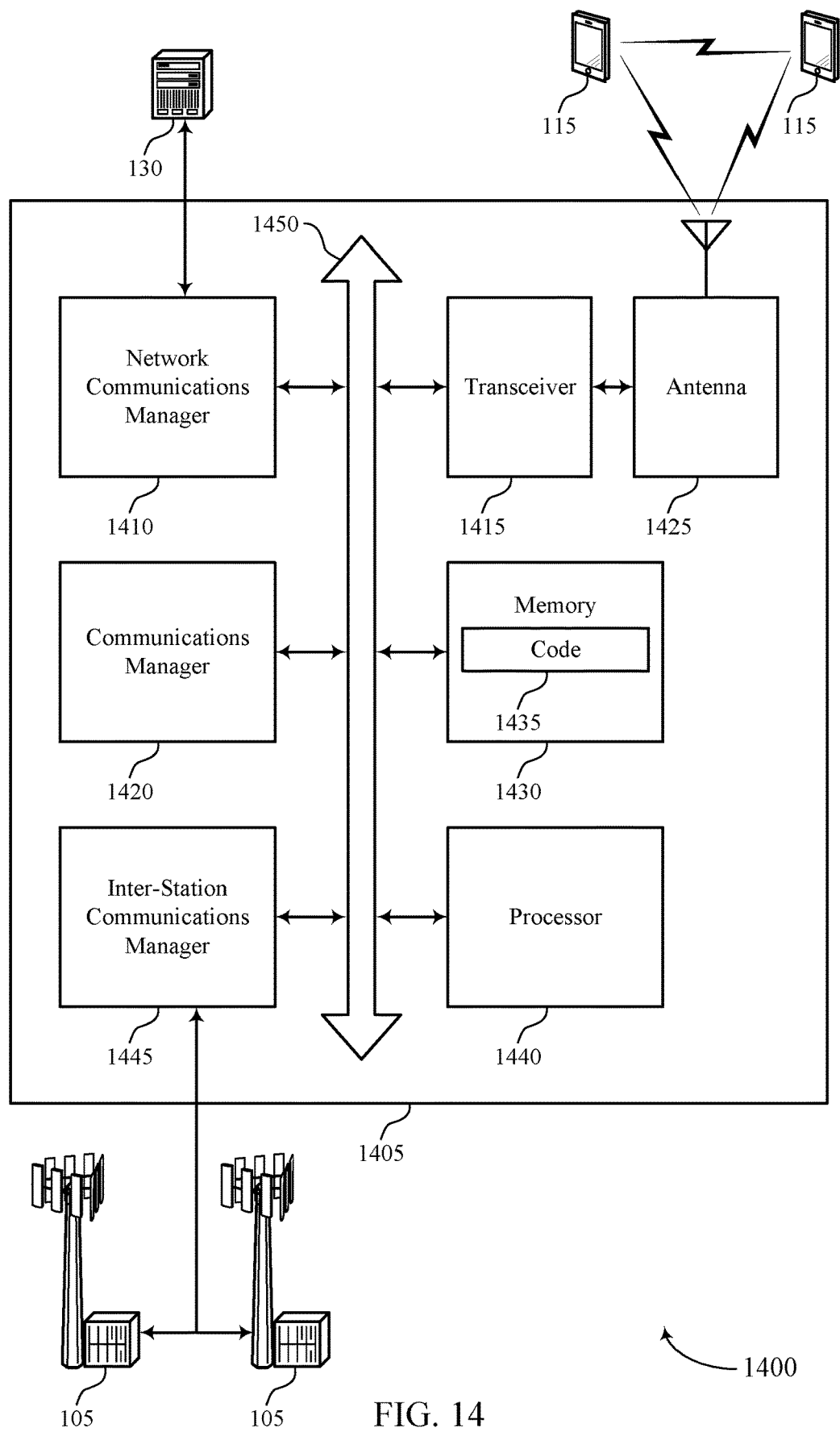
FIG. 14 shows a diagram of a system including a device that supports simultaneous PUCCH-PUSCH with different priorities in accordance with aspects of the present disclosure.

FIG. 14 shows a diagram of a system 1400 including a device 1405 that supports simultaneous PUCCH-PUSCH with different priorities in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting simultaneous PUCCH-PUSCH with different priorities). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting a feedback information piggybacking status for a first uplink carrier of a set of multiple uplink carriers configured for a UE. The communications manager 1420 may be configured as or otherwise support a means for transmitting a first uplink grant that indicates a first uplink channel transmission occasion and a first priority index for a first uplink transmission on the first uplink carrier. The communications manager 1420 may be configured as or otherwise support a means for transmitting a second uplink grant that indicates a second uplink channel transmission occasion that at least partially overlaps in time with the first uplink channel transmission occasion. The communications manager 1420 may be configured as or otherwise support a means for receiving, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both.

By including or configuring the communications manager 1420 in accordance with examples as described herein, the device 1405 may support techniques for improved handling of control information (e.g., improved HARQ procedures), improved data throughput (e.g., on PUSCH), etc. For example, the device 1405 may transmit a feedback information piggybacking status for a first uplink carrier and may more efficiently utilize the first uplink carrier for data-only PUSCH, which may improve data throughput of uplink communications. Further, the device 1405 may implement one or more aspects of the techniques described herein for efficient handling of scheduled transmissions that overlap when simultaneous PUCCH-PUSCH is supported. Based on implementing the techniques as described herein, the device may achieve better data throughput, reduced latency, and reduced power consumption.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of simultaneous PUCCH-PUSCH with different priorities as described herein, or the processor 1440 and the memory 1430 may be otherwise configured to perform or support such operations.

Figure 15:
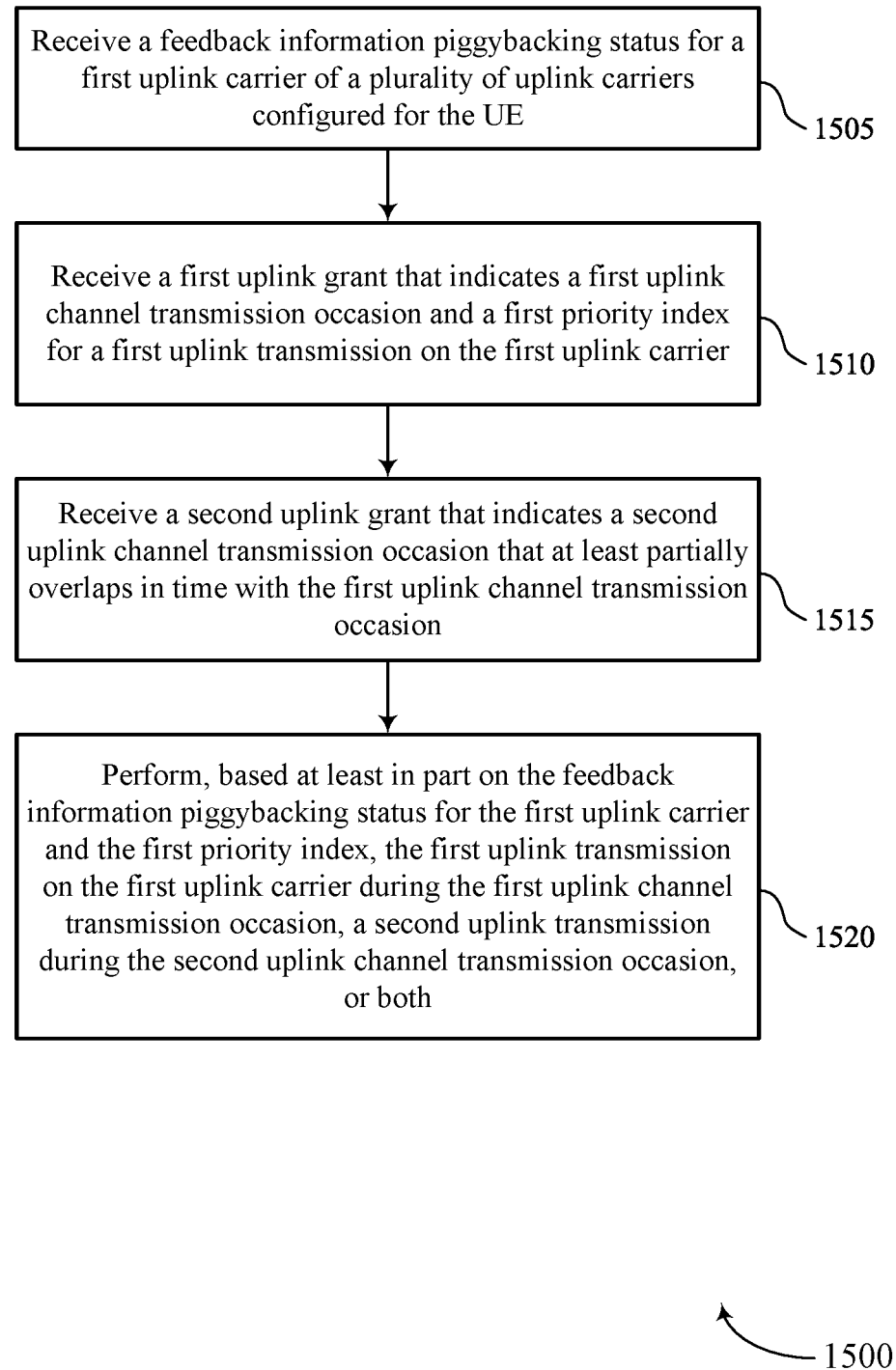
FIGS. 15 through 17 show flowcharts illustrating methods that support simultaneous PUCCH-PUSCH with different priorities in accordance with aspects of the present disclosure.

FIG. 15 shows a flowchart illustrating a method 1500 that supports simultaneous PUCCH-PUSCH with different priorities in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a feedback information piggybacking status for a first uplink carrier of a set of uplink carriers configured for the UE. The operations of 1505 may be performed according to the methods described herein. In some examples, aspects of the operations of 1505 may be performed by a carrier configuration manager as described with reference to FIGS. 7 through 10.

At 1510, the UE may receive a first uplink grant that indicates a first uplink channel transmission occasion and a first priority index for a first uplink transmission on the first uplink carrier. The operations of 1510 may be performed according to the methods described herein. In some examples, aspects of the operations of 1510 may be performed by an uplink grant manager as described with reference to FIGS. 7 through 10.

At 1515, the UE may receive a second uplink grant that indicates a second uplink channel transmission occasion that at least partially overlaps in time with the first uplink channel transmission occasion. The operations of 1515 may be performed according to the methods described herein. In some examples, aspects of the operations of 1515 may be performed by an uplink grant manager as described with reference to FIGS. 7 through 10.

At 1520, the UE may perform, based on the feedback information piggybacking status for the first uplink carrier and the first priority index, the first uplink transmission on the first uplink carrier during the first uplink channel transmission occasion, a second uplink transmission during the second uplink channel transmission occasion, or both. The operations of 1520 may be performed according to the methods described herein. In some examples, aspects of the operations of 1520 may be performed by a transmission manager as described with reference to FIGS. 7 through 10.

Figure 16:
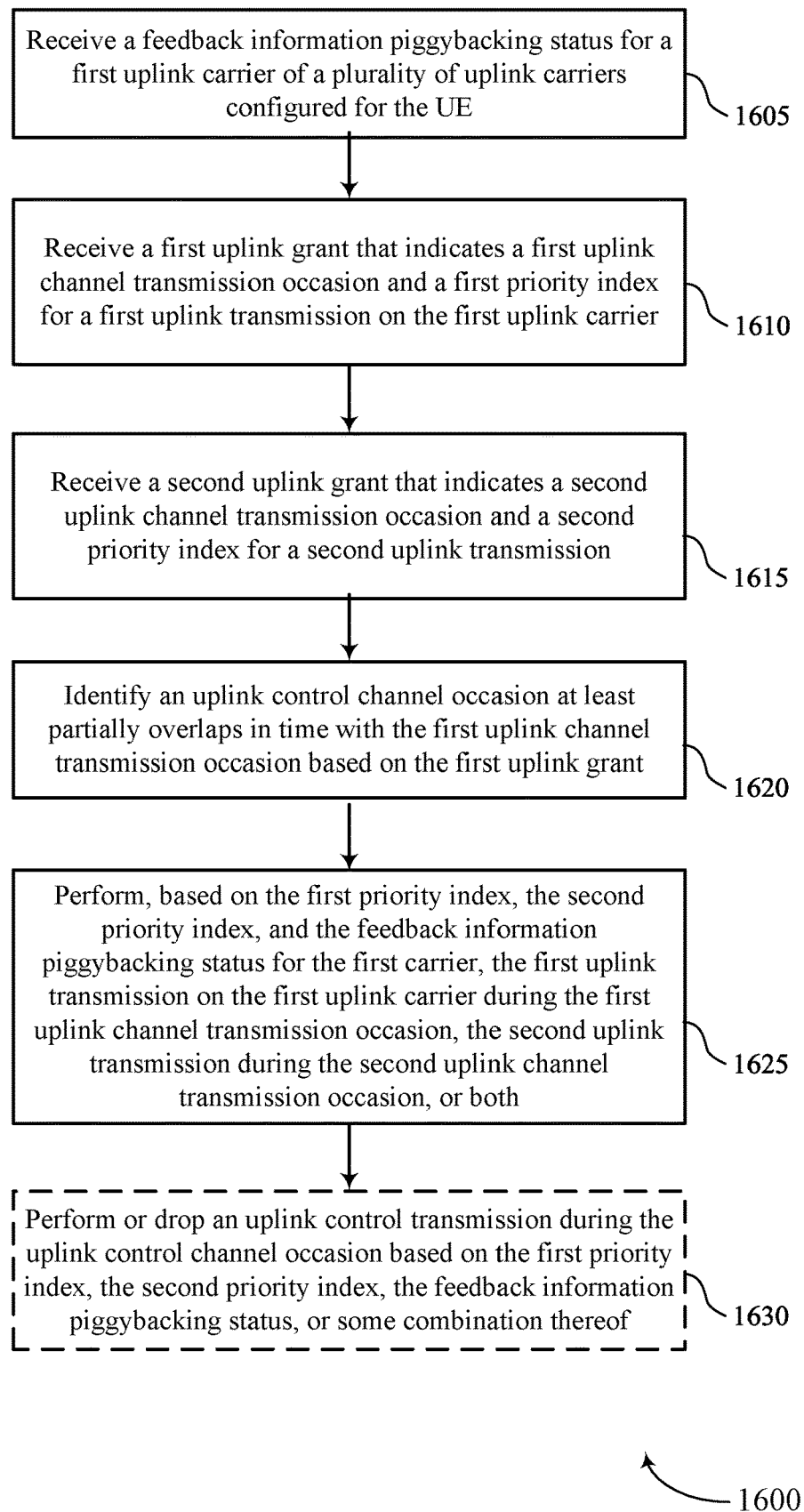

FIG. 16 shows a flowchart illustrating a method 1600 that supports simultaneous PUCCH-PUSCH with different priorities in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a feedback information piggybacking status for a first uplink carrier of a set of uplink carriers configured for the UE. The operations of 1605 may be performed according to the methods described herein. In some examples, aspects of the operations of 1605 may be performed by a carrier configuration manager as described with reference to FIGS. 7 through 10.

At 1610, the UE may receive a first uplink grant that indicates a first uplink channel transmission occasion and a first priority index for a first uplink transmission on the first uplink carrier. The operations of 1610 may be performed according to the methods described herein. In some examples, aspects of the operations of 1610 may be performed by an uplink grant manager as described with reference to FIGS. 7 through 10.

At 1615, the UE may receive the second uplink grant that indicates the second uplink channel transmission occasion and a second priority index for the second uplink transmission, where the first uplink transmission, the second uplink transmission, or both are performed based on the first priority index, the second priority index, and the feedback information piggybacking status. The operations of 1615 may be performed according to the methods described herein. In some examples, aspects of the operations of 1615 may be performed by a transmission priority manager as described with reference to FIGS. 7 through 10.

At 1620, the UE may identify an uplink control channel occasion at least partially overlaps in time with the first uplink channel transmission occasion based on the first uplink grant. The operations of 1620 may be performed according to the methods described herein. In some examples, aspects of the operations of 1620 may be performed by a PUCCH manager as described with reference to FIGS. 7 through 10.

At 1625, the UE may perform, based on the feedback information piggybacking status for the first uplink carrier and the first priority index, the first uplink transmission on the first uplink carrier during the first uplink channel transmission occasion, a second uplink transmission during the second uplink channel transmission occasion, or both. The operations of 1625 may be performed according to the methods described herein. In some examples, aspects of the operations of 1625 may be performed by a transmission manager as described with reference to FIGS. 7 through 10.

At 1630, in some cases, the UE may perform or drop an uplink control transmission during the uplink control channel occasion based on the first priority index, the second priority index, the feedback information piggybacking status, or some combination thereof. The operations of 1630 may be performed according to the methods described herein. In some examples, aspects of the operations of 1630 may be performed by a transmission manager as described with reference to FIGS. 7 through 10.

Figure 17:
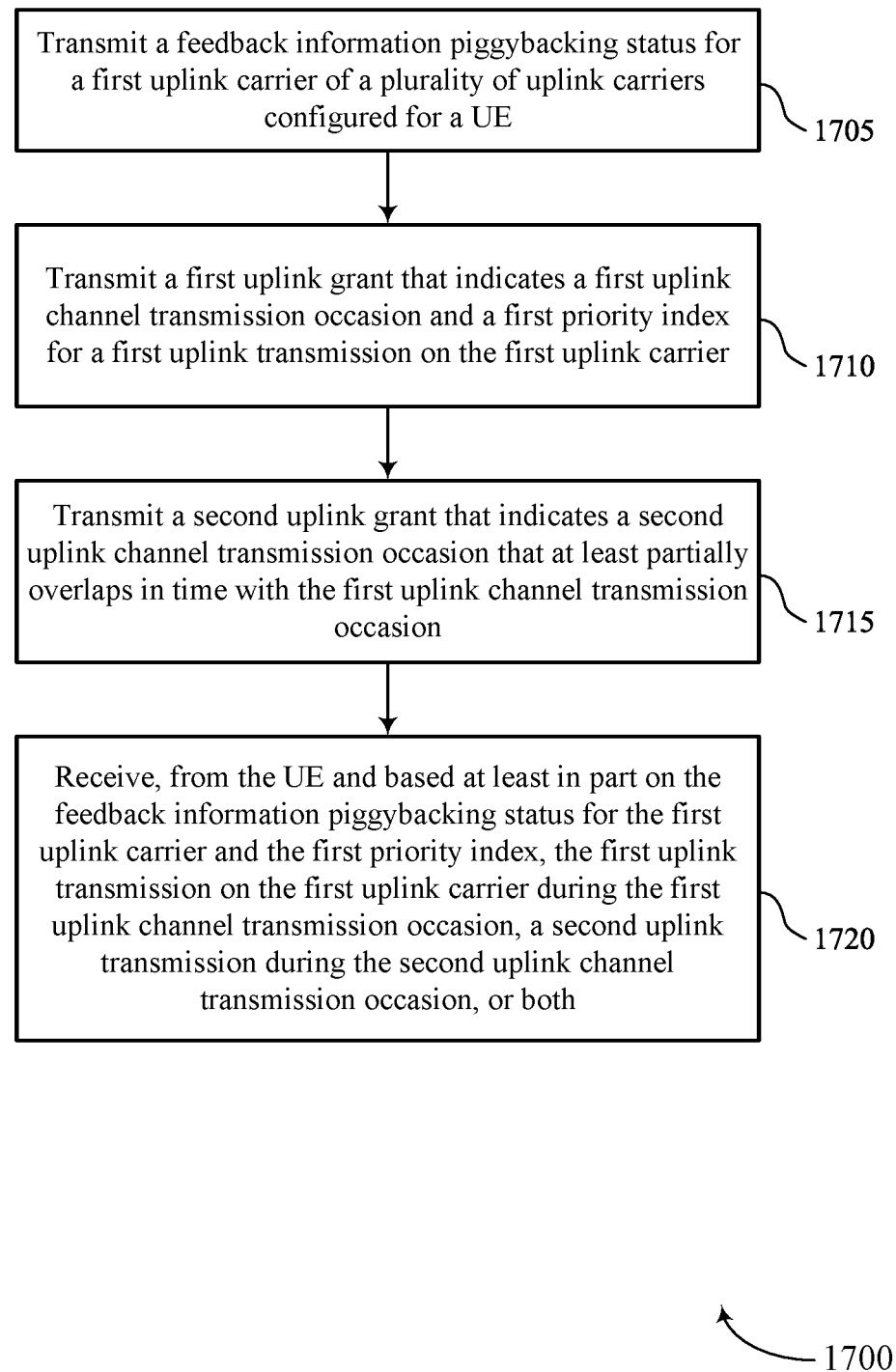

FIG. 17 shows a flowchart illustrating a method 1700 that supports simultaneous PUCCH-PUSCH with different priorities in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting a feedback information piggybacking status for a first uplink carrier of a set of multiple uplink carriers configured for a UE. The operations of 1705 may be performed in accordance with examples as disclosed herein. In some examples, aspects of the operations of 1705 may be performed by a carrier configuration manager 1325 as described with reference to FIG. 13.

At 1710, the method may include transmitting a first uplink grant that indicates a first uplink channel transmission occasion and a first priority index for a first uplink transmission on the first uplink carrier. The operations of 1710 may be performed in accordance with examples as disclosed herein. In some examples, aspects of the operations of 1710 may be performed by an uplink grant manager 1330 as described with reference to FIG. 13.

At 1715, the method may include transmitting a second uplink grant that indicates a second uplink channel transmission occasion that at least partially overlaps in time with the first uplink channel transmission occasion. The operations of 1715 may be performed in accordance with examples as disclosed herein. In some examples, aspects of the operations of 1715 may be performed by an uplink grant manager 1330 as described with reference to FIG. 13.

At 1720, the method may include receiving, from the UE and based on the feedback information piggybacking status for the first uplink carrier and the first priority index, the first uplink transmission on the first uplink carrier during the first uplink channel transmission occasion, a second uplink transmission during the second uplink channel transmission occasion, or both. The operations of 1720 may be performed in accordance with examples as disclosed herein. In some examples, aspects of the operations of 1720 may be performed by a receiving manager 1335 as described with reference to FIG. 13.

Aspect 1: A method for wireless communication at a UE, comprising: receiving a feedback information piggybacking status for a first uplink carrier of a plurality of uplink carriers configured for the UE; receiving a first uplink grant that indicates a first uplink channel transmission occasion and a first priority index for a first uplink transmission on the first uplink carrier; receiving a second uplink grant that indicates a second uplink channel transmission occasion that at least partially overlaps in time with the first uplink channel transmission occasion; and performing, based at least in part on the feedback information piggybacking status for the first uplink carrier and the first priority index, the first uplink transmission on the first uplink carrier during the first uplink channel transmission occasion, a second uplink transmission during the second uplink channel transmission occasion, or both.

Aspect 2: The method of aspect 1, further comprising: identifying a priority of the first uplink transmission and the second uplink transmission based at least in part on the first priority index and the second uplink channel transmission occasion at least partially overlapping in time with the first uplink channel transmission occasion, wherein the first uplink transmission, the second uplink transmission, or both are performed based at least in part on the priority.

Aspect 3: The method of any of aspects 1 through 2, wherein receiving the second uplink grant comprises: receiving the second uplink grant that indicates the second uplink channel transmission occasion and a second priority index for the second uplink transmission, wherein the first uplink transmission, the second uplink transmission, or both are performed based at least in part on the first priority index, the second priority index, and the feedback information piggybacking status.

Aspect 4: The method of aspect 3, further comprising: identifying an uplink control channel occasion that at least partially overlaps in time with the first uplink channel transmission occasion based at least in part on the first uplink grant; and performing or dropping an uplink control transmission during the uplink control channel occasion based at least in part on the first priority index, the second priority index, the feedback information piggybacking status, or some combination thereof.

Aspect 5: The method of aspect 4, further comprising: dropping the second uplink transmission based at least in part on the second priority index being associated with a lower priority than the first priority index, wherein the first uplink transmission and the uplink control transmission are performed based at least in part on the dropping of the second uplink transmission.

Aspect 6: The method of any of aspects 4 through 5, further comprising: dropping the first uplink transmission, the uplink control transmission, or both based at least in part on the first priority index being associated with a lower priority than the second priority index, wherein the second uplink transmission is performed based at least in part on the dropping of the first uplink transmission, the uplink control transmission, or both.

Aspect 7: The method of any of aspects 4 through 6, further comprising: identifying a second uplink control channel occasion that at least partially overlaps in time with the second uplink channel transmission occasion based at least in part on the second uplink grant; and dropping the second uplink transmission, a second uplink control transmission during the second uplink control channel occasion, or both based at least in part on the second priority index being associated with a lower priority than the first priority index, wherein the first uplink transmission and the uplink control transmission are performed based at least in part on the dropping of the second uplink transmission, the second uplink control transmission, or both.

Aspect 8: The method of any of aspects 4 through 7, further comprising: determining the second uplink transmission is associated with a second uplink carrier based at least in part on the second uplink grant, wherein the second uplink carrier is different from the first uplink carrier.

Aspect 9: The method of aspect 8, wherein the first uplink transmission and the second uplink transmission are performed based at least in part on the feedback information piggybacking status for the first uplink carrier and the second uplink carrier being different from the first uplink carrier.

Aspect 10: The method of any of aspects 4 through 9, further comprising: determining the second uplink transmission is associated with the first uplink carrier based at least in part on the second uplink grant; and dropping the second uplink transmission based at least in part on the second priority index being associated with a lower priority than the first priority index and the second uplink transmission being associated with the first uplink carrier, wherein the first uplink transmission is performed based at least in part on the dropping of the second uplink transmission.

Aspect 11: The method of any of aspects 4 through 10, further comprising: determining the first uplink transmission is associated with a first frequency band; and determining the uplink control transmission is associated with a second frequency band, wherein the first uplink transmission and the uplink control transmission are performed based at least in part on the first frequency band being different than the second frequency band.

Aspect 12: The method of any of aspects 4 through 11, further comprising: determining the uplink control transmission is associated with a first frequency band; and determining the second uplink transmission is associated with a second frequency band, wherein the uplink control transmission and the second uplink transmission are performed based at least in part on the first frequency band being different than the second frequency band.

Aspect 13: The method of any of aspects 3 through 12, further comprising: determining the first uplink transmission is associated with a first frequency band; determining the second uplink transmission is associated with the first frequency band; and dropping the first uplink transmission or the second uplink transmission based at least in part on the first uplink transmission and the second uplink transmission being associated with the first frequency band, wherein the first uplink transmission or the second uplink transmission are performed based at least in part on the dropping of the first uplink transmission or the second uplink transmission.

Aspect 14: The method of aspect 13, wherein the first uplink transmission or the second uplink transmission is dropped based at least in part on the first priority index, the second priority index, and the feedback information piggybacking status.

Aspect 15: The method of any of aspects 3 through 14, further comprising: identifying a first uplink control channel occasion that at least partially overlaps in time with the first uplink channel transmission occasion based at least in part on the first uplink grant; identifying a second uplink control channel occasion that at least partially overlaps in time with the second uplink channel transmission occasion based at least in part on the second uplink grant; and performing the first uplink transmission during the first uplink channel transmission occasion, the second uplink transmission during the second uplink channel transmission occasion, a first uplink control transmission during the first uplink control channel occasion, a second uplink control transmission during the second uplink control channel occasion, or some combination thereof based at least in part on the feedback information piggybacking status.

Aspect 16: The method of aspect 15, wherein the first uplink transmission and the first uplink control transmission are configured on a first cell group and the second uplink transmission and the second uplink control transmission are configured on a second cell group.

Aspect 17: A method for wireless communication at a base station, comprising: transmitting a feedback information piggybacking status for a first uplink carrier of a plurality of uplink carriers configured for a UE; transmitting a first uplink grant that indicates a first uplink channel transmission occasion and a first priority index for a first uplink transmission on the first uplink carrier; transmitting a second uplink grant that indicates a second uplink channel transmission occasion that at least partially overlaps in time with the first uplink channel transmission occasion; and receiving, from the UE and based at least in part on the feedback information piggybacking status for the first uplink carrier and the first priority index, the first uplink transmission on the first uplink carrier during the first uplink channel transmission occasion, a second uplink transmission during the second uplink channel transmission occasion, or both.

Aspect 18: An apparatus for wireless communication at a UE, comprising a processor; memory coupled with the processor; and instructions stored in the memory and executable by the processor to cause the apparatus to perform a method of any of aspects 1 through 16.

Aspect 19: An apparatus for wireless communication at a UE, comprising at least one means for performing a method of any of aspects 1 through 16.

Aspect 20: A non-transitory computer-readable medium storing code for wireless communication at a UE, the code comprising instructions executable by a processor to perform a method of any of aspects 1 through 16.

Aspect 21: An apparatus for wireless communication at a base station, comprising a processor; memory coupled with the processor; and instructions stored in the memory and executable by the processor to cause the apparatus to perform a method of aspect 17.

Aspect 22: An apparatus for wireless communication at a base station, comprising at least one means for performing a method of aspect 17.

Aspect 23: A non-transitory computer-readable medium storing code for wireless communication at a base station, the code comprising instructions executable by a processor to perform a method of aspect 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a feedback information multiplexing status for an uplink carrier configured for the UE, the feedback information multiplexing status comprising an indicator associated with the uplink carrier;
    receiving an indication of a first uplink transmission on the uplink carrier that at least partially overlaps in time with a second uplink transmission, the first uplink transmission associated with a first priority index and the second uplink transmission associated with a second priority index; and
    performing, based at least in part on the feedback information multiplexing status for the uplink carrier, the first priority index, and the second priority index, a physical uplink shared channel (PUSCH) transmission without uplink control information (UCI) multiplexing on the uplink carrier.

2. The method of claim 1, further comprising:
    identifying a priority of the first uplink transmission and the second uplink transmission based at least in part on the first priority index and the second uplink transmission at least partially overlapping in time with the first uplink transmission, wherein the first uplink transmission, the second uplink transmission, or both are performed based at least in part on the priority.

3. The method of claim 1, wherein the PUSCH transmission without UCI multiplexing on the uplink carrier comprises the first uplink transmission, the second uplink transmission, or both.

4. The method of claim 1, further comprising:
    receiving a first uplink grant that indicates a first uplink channel transmission occasion and a first priority index for the first uplink transmission on the uplink carrier.

5. The method of claim 4, further comprising:
    receiving a second uplink grant that indicates a second uplink channel transmission occasion and the second priority index for the second uplink transmission, wherein the PUSCH transmission without UCI multiplexing on the uplink carrier comprises the first uplink transmission, the second uplink transmission, or both.

6. The method of claim 5, further comprising:
    identifying an uplink control channel occasion that at least partially overlaps in time with the first uplink channel transmission occasion based at least in part on the first uplink grant; and
    performing or dropping an uplink control transmission during the uplink control channel occasion based at least in part on the first priority index, the second priority index, the feedback information multiplexing status, or some combination thereof.

7. The method of claim 6, further comprising:
dropping the second uplink transmission based at least in part on the second priority index being associated with a lower priority than the first priority index, wherein the first uplink transmission and the uplink control transmission are performed based at least in part on the dropping of the second uplink transmission.

8. The method of claim 6, further comprising:
dropping the first uplink transmission, the uplink control transmission, or both based at least in part on the first priority index being associated with a lower priority than the second priority index, wherein the second uplink transmission is performed based at least in part on the dropping of the first uplink transmission, the uplink control transmission, or both.

9. The method of claim 6, further comprising:
identifying a second uplink control channel occasion that at least partially overlaps in time with the second uplink channel transmission occasion based at least in part on the second uplink grant; and
dropping the second uplink transmission, a second uplink control transmission during the second uplink control channel occasion, or both based at least in part on the second priority index being associated with a lower priority than the first priority index, wherein the first uplink transmission and the uplink control transmission are performed based at least in part on the dropping of the second uplink transmission, the second uplink control transmission, or both.

10. The method of claim 6, further comprising:
determining the second uplink transmission is associated with a second uplink carrier based at least in part on the second uplink grant, wherein the second uplink carrier is different from the uplink carrier.

11. The method of claim 10, wherein the first uplink transmission and the second uplink transmission are performed based at least in part on the feedback information multiplexing status for the uplink carrier and the second uplink carrier being different from the uplink carrier.

12. The method of claim 6, further comprising:
determining the second uplink transmission is associated with the uplink carrier based at least in part on the second uplink grant; and
dropping the second uplink transmission based at least in part on the second priority index being associated with a lower priority than the first priority index and the second uplink transmission being associated with the uplink carrier, wherein the first uplink transmission is performed based at least in part on the dropping of the second uplink transmission.

13. The method of claim 6, further comprising:
determining the first uplink transmission is associated with a first frequency band; and
determining the uplink control transmission is associated with a second frequency band, wherein the first uplink transmission and the uplink control transmission are performed based at least in part on the first frequency band being different than the second frequency band.

14. The method of claim 6, further comprising:
determining the uplink control transmission is associated with a first frequency band; and
determining the second uplink transmission is associated with a second frequency band, wherein the uplink control transmission and the second uplink transmission are performed based at least in part on the first frequency band being different than the second frequency band.

15. The method of claim 5, further comprising:
determining the first uplink transmission is associated with a first frequency band;
determining the second uplink transmission is associated with the first frequency band; and
dropping the first uplink transmission or the second uplink transmission based at least in part on the first uplink transmission and the second uplink transmission being associated with the first frequency band, wherein the first uplink transmission or the second uplink transmission are performed based at least in part on the dropping of the first uplink transmission or the second uplink transmission.

16. The method of claim 15, wherein the first uplink transmission or the second uplink transmission is dropped based at least in part on the first priority index, the second priority index, and the feedback information multiplexing status.

17. The method of claim 5, further comprising:
identifying a first uplink control channel occasion that at least partially overlaps in time with the first uplink channel transmission occasion based at least in part on the first uplink grant;
identifying a second uplink control channel occasion that at least partially overlaps in time with the second uplink channel transmission occasion based at least in part on the second uplink grant; and
performing the first uplink transmission during the first uplink channel transmission occasion, the second uplink transmission during the second uplink channel transmission occasion, a first uplink control transmission during the first uplink control channel occasion, a second uplink control transmission during the second uplink control channel occasion, or some combination thereof based at least in part on the feedback information multiplexing status.

18. The method of claim 17, wherein the first uplink transmission and the first uplink control transmission are configured on a first cell group and the second uplink transmission and the second uplink control transmission are configured on a second cell group.

19. An apparatus for wireless communication at a user equipment (UE), comprising:
one or more processors,
one or more memories coupled with the one or more processors; and
instructions stored in the one or more memories and executable by the one or more processors to cause the apparatus to:
receive a feedback information multiplexing status for an uplink carrier configured for the UE, the feedback information multiplexing status comprising an indicator associated with the uplink carrier;
receive an indication of a first uplink transmission on the uplink carrier that at least partially overlaps in time with a second uplink transmission, the first uplink transmission associated with a first priority index and the second uplink transmission associated with a second priority index; and
perform, based at least in part on the feedback information multiplexing status for the uplink carrier, the first priority index, and the second priority index, a physical uplink shared channel (PUSCH) transmission without uplink control information (UCI) multiplexing on the uplink carrier.

20. The apparatus of claim 19, wherein the instructions are further executable by the one or more processors to cause the apparatus to:
identify a priority of the first uplink transmission and the second uplink transmission based at least in part on the first priority index and the second uplink transmission at least partially overlapping in time with the first uplink transmission, wherein the first uplink transmission, the second uplink transmission, or both are performed based at least in part on the priority.

21. The apparatus of claim 19, wherein the PUSCH transmission without UCI multiplexing on the uplink carrier comprises the first uplink transmission, the second uplink transmission, or both.

22. The apparatus of claim 19, wherein the instructions are further executable by the one or more processors to cause the apparatus to:
receive a first uplink grant that indicates a first uplink channel transmission occasion and a first priority index for the first uplink transmission on the uplink carrier.

23. The apparatus of claim 22, wherein the instructions are further executable by the one or more processors to cause the apparatus to:
receive a second uplink grant that indicates a second uplink channel transmission occasion and the second priority index for the second uplink transmission, wherein the PUSCH transmission without UCI multiplexing on the uplink carrier comprises the first uplink transmission, the second uplink transmission, or both.

24. A method for wireless communication at a network device, comprising:
transmitting a feedback information multiplexing status for a uplink carrier configured for a user equipment (UE), the feedback information multiplexing status comprising an indicator associated with the uplink carrier;
transmitting an indication of a first uplink transmission on the uplink carrier that at least partially overlaps in time with a second uplink transmission, the first uplink transmission associated with a first priority index and the second uplink transmission associated with a second priority index; and
receiving, from the UE and based at least in part on the feedback information multiplexing status for the uplink carrier, the first priority index, and the second priority index, a physical uplink shared channel (PUSCH) transmission without uplink control information (UCI) multiplexing on the uplink carrier.

* * * * *